US008750242B2

(12) United States Patent
Forte et al.

(10) Patent No.: US 8,750,242 B2
(45) Date of Patent: Jun. 10, 2014

(54) METHODS, MEDIA, AND DEVICES FOR MOVING A CONNECTION FROM ONE POINT OF ACCESS TO ANOTHER POINT OF ACCESS

(75) Inventors: Andrea G. Forte, Brooklyn, NY (US); Henning G. Schulzrinne, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 902 days.

(21) Appl. No.: 12/125,617

(22) Filed: May 22, 2008

(65) Prior Publication Data

US 2008/0285520 A1  Nov. 20, 2008

Related U.S. Application Data

(63) Continuation-in-part of application No. PCT/US2006/045000, filed on Nov. 20, 2006.

(60) Provisional application No. 60/739,137, filed on Nov. 22, 2005, provisional application No. 60/813,022, filed on Jun. 13, 2006.

(51) Int. Cl.
*H04Q 7/20* (2006.01)

(52) U.S. Cl.
USPC ............ 370/331; 370/332; 370/333; 370/334

(58) Field of Classification Search
USPC .................................................. 370/331–334
See application file for complete search history.

(56) References Cited

U.S. PATENT DOCUMENTS

| 5,440,723 | A | 8/1995 | Arnold et al. |
| 5,896,373 | A | 4/1999 | Mitts et al. |
| 6,101,541 | A | 8/2000 | Ellesson et al. |
| 6,473,413 | B1 * | 10/2002 | Chiou et al. ................. 370/331 |
| 6,681,108 | B1 | 1/2004 | Terry et al. |
| 6,690,918 | B2 | 2/2004 | Evans et al. |
| 6,965,674 | B2 * | 11/2005 | Whelan et al. ............... 380/270 |
| 7,072,652 | B2 * | 7/2006 | Stephens .................... 455/432.1 |
| 7,082,114 | B1 * | 7/2006 | Engwer et al. ............... 370/331 |

(Continued)

FOREIGN PATENT DOCUMENTS

WO    WO2008118976    10/2008

OTHER PUBLICATIONS

International Search Report and Written Opinion issued for corresponding International Patent Application No. PCT/US2006/045000.

(Continued)

*Primary Examiner* — Jay P Patel

(57) ABSTRACT

Systems, methods, media, and devices for providing cooperation among digital processing devices in wireless networks are provided. In some embodiments, methods for moving a connection from one point of access to another point of access are provided, sending a request for information from a first mobile node to at least one other node, wherein the request for information contains first information identifying at least one point of access; receiving a response containing second information identifying at least one point of access from the at least one other node; and establishing a connection between the first mobile node and a point of access identified in the second information. In some embodiments, devices that can move a connection from one point of access to another point of access are provided.

27 Claims, 10 Drawing Sheets

| To DS | From DS | Address 1 | Address 2 | Address 3 | Address 4 |
|-------|---------|-----------|-----------|-----------|-----------|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

(706, 707, 702, 703, 704, 705)

(56) References Cited

U.S. PATENT DOCUMENTS

| | | | | |
|---|---|---|---|---|
| 7,133,526 | B2* | 11/2006 | Whelan et al. | 380/270 |
| 7,171,215 | B2* | 1/2007 | Khouaja et al. | 455/452.2 |
| 7,219,239 | B1 | 5/2007 | Njemanze et al. | |
| 7,246,156 | B2 | 7/2007 | Ginter et al. | |
| 7,373,508 | B1 | 5/2008 | Meter et al. | |
| 7,376,128 | B2* | 5/2008 | Chen et al. | 370/352 |
| 7,376,969 | B1 | 5/2008 | Njemanze et al. | |
| 7,444,679 | B2 | 10/2008 | Tarquini et al. | |
| 7,502,615 | B2* | 3/2009 | Wilhoite et al. | 455/442 |
| 7,519,998 | B2 | 4/2009 | Cai et al. | |
| 7,543,125 | B2* | 6/2009 | Gokhale | 711/162 |
| 7,607,170 | B2 | 10/2009 | Chesla | |
| 7,620,723 | B2 | 11/2009 | Chen et al. | |
| 7,643,464 | B2* | 1/2010 | Garg | 370/348 |
| 7,681,235 | B2 | 3/2010 | Chesla et al. | |
| 7,773,587 | B2* | 8/2010 | Corcoran | 370/352 |
| 7,805,140 | B2* | 9/2010 | Friday et al. | 455/436 |
| 7,873,352 | B2* | 1/2011 | Nguyen et al. | 455/411 |
| 7,877,621 | B2 | 1/2011 | Jacoby et al. | |
| 7,924,785 | B2* | 4/2011 | Shaheen et al. | 370/331 |
| 8,041,319 | B2* | 10/2011 | He et al. | 455/144 |
| 2001/0036834 | A1* | 11/2001 | Das et al. | 455/458 |
| 2002/0135515 | A1 | 9/2002 | Rankin et al. | |
| 2003/0050959 | A1 | 3/2003 | Faybishenko et al. | |
| 2003/0084319 | A1 | 5/2003 | Tarquini et al. | |
| 2003/0084344 | A1 | 5/2003 | Tarquini et al. | |
| 2003/0187832 | A1 | 10/2003 | Reader | |
| 2003/0219129 | A1* | 11/2003 | Whelan et al. | 380/270 |
| 2004/0111477 | A1 | 6/2004 | Boss et al. | |
| 2004/0190902 | A1* | 9/2004 | Tamai | 398/68 |
| 2004/0267876 | A1 | 12/2004 | Kakivaya et al. | |
| 2005/0038876 | A1 | 2/2005 | Chaudhuri | |
| 2005/0063325 | A1 | 3/2005 | Kim et al. | |
| 2005/0088993 | A1 | 4/2005 | Jung et al. | |
| 2005/0101309 | A1 | 5/2005 | Croome | |
| 2005/0122940 | A1 | 6/2005 | Nian | |
| 2005/0130658 | A1* | 6/2005 | Stephens | 455/436 |
| 2005/0138178 | A1* | 6/2005 | Astarabadi | 709/227 |
| 2005/0141457 | A1 | 6/2005 | Lee et al. | |
| 2005/0201330 | A1* | 9/2005 | Park et al. | 370/331 |
| 2005/0255847 | A1 | 11/2005 | Han et al. | |
| 2005/0259671 | A1* | 11/2005 | Jung et al. | 370/410 |
| 2005/0282547 | A1* | 12/2005 | Kim et al. | 455/436 |
| 2006/0025128 | A1* | 2/2006 | Lee | 455/432.1 |
| 2006/0078124 | A1* | 4/2006 | Whelan et al. | 380/273 |
| 2006/0089876 | A1 | 4/2006 | Boys | |
| 2006/0187873 | A1* | 8/2006 | Friday et al. | 370/328 |
| 2006/0218229 | A1 | 9/2006 | Pandey et al. | |
| 2006/0229054 | A1 | 10/2006 | Erola et al. | |
| 2006/0274743 | A1* | 12/2006 | Yegin et al. | 370/389 |
| 2007/0233776 | A1 | 10/2007 | Palm | |
| 2008/0076409 | A1 | 3/2008 | Hinrikus et al. | |
| 2008/0192691 | A1* | 8/2008 | Park et al. | 370/331 |
| 2008/0285520 | A1 | 11/2008 | Forte et al. | |
| 2010/0142484 | A1* | 6/2010 | Bachmann et al. | 370/331 |
| 2010/0322198 | A1* | 12/2010 | Friday et al. | 370/332 |
| 2011/0064063 | A1* | 3/2011 | Kim et al. | 370/338 |
| 2011/0182270 | A1* | 7/2011 | Shaheen et al. | 370/331 |

OTHER PUBLICATIONS

"Meetro", Wikipedia, Jul. 22, 2007, available at: http://en.wikipedia.org/wiki/Meetro.

"SONbuddy Now Available Online", Greenpacket.com, Dec. 9, 2003, available at: http://www.greenpacket.com/company/news_detail.asp?id=82.

Arrington, M., "Another Proximity Based IM Service", TechCrunch, Aug. 22, 2006, available at: http://techcrunch.com/2006/08/22/another-proximity-based-im-service/.

Brookshier, D., et al., "JXTA: Java P2P Programming", Sams Publishing, Mar. 22, 2002, pp. 1-291.

Eisenstadt, M., "Improving Radius IM for Geolocation + Chat", EisenBlog 2.0, Nov. 1, 2006, available at: http://eisenstadt.wordpress.com/2006/11/01/.

Frankl, P.G. and Goodman, D.J., "Delivering Information 'To Go' via Infostations", Technical Report WICAT TR 02-008, Polytechnic University, Nov. 2002, pp. 1-14.

Mangold, S. and Berlemann, L., "IEEE 802.11k: Improving Confidence in Radio Resource Measurements", In Proceedings of the IEEE 16th International Symposium on Personal, Indoor and Mobile Radio Communications (PIMRC '005), vol. 2, Berlin, DE, Sep. 11-14, 2005, pp. 1009-1013.

Price, G., "Google Makes an Acquisition: Dodgeball.com", Search Engine Watch, May 11, 2005, available at : http://blog.searchenginewatch.com/blog/050511-194257.

Snurchy, "Meetro Beta User Reviews", CNET, Oct. 12, 2005, available at: http://reviews.cnet.com/instant-messaging/meetro-beta/4852-9237_7-31485538.html.

"DHCP Distribution Version 3.0.7 README File", Internet System Consortium (ISC), May 16, 2008, available at: http://www.isc.org/sw/dhcp/.

"Relax NG Website", http://www.relaxng.org/, Dec. 2006.

Aboba, B., et al., "Detecting Network Attachment in IPv4 (DNAv4)", Technical Report, RFC 4436, Mar. 2006.

Aboba, B., et al., "Extensible Authentication Protocol (EAP) Key Management Framework", IETF Draft, Nov. 11, 2007.

Aboba, B., et al., "Extensible Authentication Protocol (EAP)", Technical Report, RFC 3748, Jun. 2004.

Acme, "Thttpd, A Small-Footprint Web Server", Dec. 2006, available at: http://www.acme.com/software/thttpd/.

Almeida, V., et al., "Characterizing Reference Locality in the WWW", In Fourth International Conference on Parallel and Distributed Information Systems (PDIS), Miami Beach, FL, USA, Dec. 18-20, 1996, pp. 92-103.

Antoniadis, P., et al., "Incentives for Content Availability in Memory-Less Peer-to-Peer File Sharing Systems", In ACM SIGecom Exchanges, vol. 5, No. 4, Jul. 2005, pp. 11-20.

Balachandran, A., et al., "Characterizing User Behavior and Network Performance in a Public Wireless LAN", In Proceedings of the 2002 ACM Sigmetrics International Conference on Measurement and Modeling of Computer Systems (Sigmetrics '02), vol. 30, No. 1, Jun. 2002, pp. 195-205.

Buragohain, C., et al., "A Game Theoretic Framework for Incentives in P2P Systems", In Proceedings of the Third International Conference on Peer-to-Peer Computing (P2P 2003), Washington, DC, USA, Sep. 1-3, 2003, pp. 48-56.

Buttyan, L., et al., "Spontaneous Cooperation in Multi-Domain Sensor Networks", In Proceedings of the Second European conference on Security and Privacy in Ad-Hoc and Sensor Networks (ESAS'05), 2005, pp. 42-53.

Camarillo, G., et al., "Grouping of Media Lines in the Session Description Protocol (SDP)", Technical Report, RFC 3388, Dec. 2002.

Chandra, R., et. al., "WiFiProfiler: Cooperative Diagnosis in Wireless LANs", In Proceedings of the 4th International Conference on Mobile Systems, Applications and Services (MobiSys '06), Uppsala, SW, Jun. 19-22, 2006, pp. 205-219.

Chardra, R., et al., "MultiNet: Connecting to Multiple IEEE 802.11 Networks Using a Single Wireless Card", In Twenty-Third Annual Joint Conference of the IEEE Computer and Information Societies (Infocom 2004), vol. 2, Mar. 7-11, 2004, pp. 882-893.

Chow, R. et. al., "Authentication in the Clouds: A Framework and its Application to Mobile Users", In Proceedings of the 2010 ACM Workshop on Cloud Computing Security Workshop (CCSW'10), Chicago, IL, USA, Oct. 8, 2010, pp. 1-6.

Cole, R.G., et. al., "Requirements on Worm Mitigation Technologies in Manets", In Proceeding of the Workshop on Principles of Advanced and Distributed Simulation (PADS'05), Jun. 1-3, 2005, pp. 207-214.

Curl Website, "Libcurl—The Multiprotocol File Transfer Library", Dec. 2006, available at: http://curl.haxx.se/libcurl/.

Cygwin Website, "Cygwin User's Guide", Dec. 2006, available at: http://cygwin.com/.

DarwinPorts Website, 2006, available at: http://www.darwinports.org/.

Day, M., et al., "A Model for Presence and Instant Messaging", Technical Report, RFC 2778, Feb. 2000.

(56) References Cited

OTHER PUBLICATIONS

Dodgeball, "Help Page", Sep. 2006, http://www.dodgeball.com/help.

Droms, R., "Dynamic Host Configuration Protocol", Technical Report, RFC 2131, Mar. 1997.

Feldman, M., et. al., "Robust Incentive Techniques for Peer-to-Peer Networks", In Proceedings of the Fifth ACM Conference on Electronic Commerce (EC '4), New York, NY, USA, May 17-20, 2004, pp. 102-111.

Forte, A.G., et. al., "IEEE 802.11 in the Large: Observations at the IETF Meeting", Technical Report, Department of Computer Science, Columbia University, 2008.

Forte, A.G., et. al., "Improving L3 Handoff Delay in IEEE 802.11 Wireless Networks", In Proceedings of the 2nd Annual International Wireless Internet Conference (WICON '6), vol. 220, No. 12, Aug. 12-15, 2006.

Fretzagias, C. And Papadopouli, M., "Cooperative Location-Sensing for Wireless Networks", In Proceedings of the Second IEEE Annual Conference on Pervasive Computing and Communications (PERCOM '04), Orlando, FL, USA, Mar. 14-17, 2004, pp. 121-131.

Gnutella Website, "Gnutella Protocol Development", 2006, available at: http://www.the-gdf.org/.

Hayes, A. and Wilson, D., "Peer-to-Peer Information Sharing in a Mobile Ad Hoc Environment", In Proceedings of the Sixth IEEE Workshop on Mobile Computing Systems and Applications (WMCSA 2004), Dec. 2-3, 2004, pp. 154-162.

Heinemann, V., et. al., "iCLouds—Peer-to-Peer Information Sharing in Mobile Environments", In Proceedings of the Ninth International Euro-Par Conference (Euro-Par 2003), 2003, pp. 1038-1045.

Henderson, T., et. al., "The Changing Usage of a Mature Campus-Wide Wireless Network", In Proceedings of the Tenth Annual International Conference on Mobile Computing and Networking (MobiCom 2004), Philadelphia, PA, USA, Sep. 26-Oct. 1, 2004, pp. 187-201.

Hsieh, R., et. al., "S-MIP: A Seamless Handoff Architecture for Mobile IP", In Proceedings of the IEEE Societies Twenty-Second Annual Joint Conference of the IEEE Computer and Communications (INFOCOM 2003), vol. 3, Mar. 30-Apr. 3, 2003, pp. 1774-1784.

Huang, Y., and Wenke, L., "A Cooperative Intrusion Detection System for Ad Hoc Networks", In Proceedings of the 1st ACM Workshop on Security of Ad Hoc and Sensor Networks (SASN '03), 2003, pp. 135-147.

Hunter, T.E., and Nosratinia, A., "Diversity Through Coded Cooperation", Technical Report, University of Texas, Dallas, Feb. 2004.

IEEE Computer Society, "Draft Recommended Practice for Multi-Vendor Access Point Interoperability via an Inter-Access Point Protocol Across Distribution Systems Supporting IEEE 802.11 Operation", Jan. 2003, pp. 1-79.

IEEE Computer Society, "IEEE Draft Standard for Local and Metropolitan Area Networks: Media Independent Handover Services", White Paper, Jan. 2006, pp. 1-158.

IEEE Computer Society, "IEEE Standard for Information Technology—Telecommunications and Information Exchange Between Systems—Local and Metropolitan Area Networks-Specific Requirements: Amendment 8: Medium Access Control (MAC) Quality of Service Enhancements", 2005.

IEEE Computer Society, "IEEE Standard for Information Technology, Telecommunications and Information Exchange Between Systems, Local and Metropolitan Area Networks, Specific Requirements—Amendment 6: Medium Access Control (MAC) Security Enhancements", 2004, pp. 1-175.

International Patent Application No. PCT/US06/42713, filed Oct. 31, 2006.

International Patent Application No. PCT/US2006/45000, filed Nov. 20, 2006.

International Patent Application No. PCT/US2007/022188, filed Oct. 17, 2007.

International Patent Application No. PCT/US2008/058294, filed Mar. 26, 2008.

International Preliminary Report on Patentability in International Patent Application No. PCT/US2006/042713, filed Oct. 13, 2006, mailed Apr. 9, 2009.

International Preliminary Report on Patentability in International Patent Application No. PCT/US2006/45000, filed Nov. 20, 2006, mailed Jun. 5, 2008.

International Preliminary Report on Patentability in International Patent Application No. PCT/US2007/022188, filed Oct. 17, 2007, mailed Apr. 22, 2009.

International Preliminary Report on Patentability in International Patent Application No. PCT/US2008/058294, filed Mar. 26, 2008, mailed Oct. 8, 2009.

International Search Report in International Patent Application No. PCT/US2006/042713, filed, Oct. 31, 2006, mailed Apr. 9, 2008.

International Search Report in International Patent Application No. PCT/US2007/022188, filed Oct. 17, 2007, mailed Jun. 20, 2008.

International Search Report in International Patent Application No. PCT/US2008/058294, filed Mar. 26, 2008, mailed Aug. 21, 2008.

Jardosh, A.P., et. al., "Understanding Link-Layer Behavior in Highly Congested IEEE 802.11b Wireless Networks", In Proceedings of the 2005 ACM SIGCOMM Workshop on Experimental Approached to Wireless Network Design and Analysis (E-WIND 2005), Philadelphia, PA, USA, Aug. 22-26, 2005, pp. 11-16.

Jelenkovic, P. and Radovanovic, A., "Asymptotic Insensitivity of Least-Recently-Used Caching to Statistical Dependency", In IEEE Societies Twenty-Second Annual Joint Conference of the IEEE Computer and Communications (INFOCOM 2003), vol. 1, Mar. 30-Apr. 3, 2003, pp. 438-447.

Kempf, J., et. al., "Detecting Network Attachment in IPv6 Networks (DNAv6)", Technical Report, Jun. 25, 2006.

Klemm, A., et. al., "A Special-Purpose Peer-to-Peer File Sharing System for Mobile Ad Hoc Networks", In IEEE Vehicular Technology Conference (VTC 2003-Fall), vol. 4, Oct. 6-9, 2003, pp. 2758-2763.

Klensin, J., "Simple Mail Transfer Protocol", Technical Report, RFC 2821, Apr. 2001, available at: http://www.ietf.org/rfc/rfc2821.txt.

Kortuem, G., et. al., "When Peer-to-Peer Comes Face-to-Face: Collaborative Peer-to-Peer Computing in Mobile Ad Hoc Networks", In Proceedings of the First International Conference on Peer-to-Peer Computing (P2P'01), Aug. 27-29, 2001, pp. 75-91.

Koutsonikolas, D., et. al., "CoCoA: Coordinated Cooperative Localization for Mobile Multi-Robot Ad Hoc Networks", In the 26th IEEE International Conference on Distributed Computing Systems Workshops (ICDSC 2006), Jul. 4-7, 2006.

Lara, M.R., "Public Internet Project Website", Jul. 2006, available at: http://publicinternetproject.org/.

Lemon, T., and Sommerfield, B., "Node-Specific Client Identifiers for Dynamic Host Configuration Protocol Version Four (DHCPv4)", Technical Report, RFC 4361, Feb. 2006.

Lighttpd Website, "Lighttpd: The Painless Way-Manual", Dec. 2006, available at: http://www.lighttpd.net/.

Liu, P., et. al., "A Cooperative MAC Protocol for Wireless Local Area Networks", In IEEE International Conference on Communications (ICC 2005), vol. 5, May 16-20, 2005, pp. 2962-2968.

Longo, C., "Your Wireless Future", CNN Money.com, Jun. 1, 2006, available at: http://money.cnn.com/magazines/business2/business2_archive/2006/05/01/8375915/index.htm.

Malinen, J., "Host AP Driver for Intersil Prism2/2.5/3, Hostapd, and WPA Supplicant", 2005, available at: http://hostap.epitest.fi.

Malinen, J., "Linux WPA/WPA2/IEEE 802.1x Supplicant", 2005, available at: http://hostap.epitest.fi/wpa_supplicant.

Microsoft TechNet, "People Near Me", Sep. 27, 2006, available at: http://technet.microsoft.com/en-us/library/bb726969.aspx.

Mishra, A., et. al., "An Empirical Analysis of the IEEE 802.11 MAC Layer Handoff Process", In ACM SIGCOMM Computer Communication Review, vol. 33, No. 2, Apr. 2003, pp. 93-102.

Office Action dated May 8, 2012 in U.S. Appl. No. 12/092,224.

Office Action dated Aug. 20, 2012 in U.S. Appl. No. 12/593,209.

Office Action dated Oct. 2, 2012 in U.S. Appl. No. 12/092,224.

Office Action dated Oct. 26, 2011 in U.S. Appl. No. 12/593,209.

Papadopouli, M. and Schulzrinne, H., "Design and Implementation of a Peer-to-Peer Data Dissemination and Prefetching Tool for

(56) References Cited

OTHER PUBLICATIONS

Mobile Users", In First NY Metro Area Networking Workshop, Hawthorne, NY, USA, Mar. 2001.
Papadopouli, M. and Schulzrinne, H., "Effects of Power Conservation, Wireless Coverage and Cooperations on Data Dissemination Among Mobile Devices", In Proceedings of the 2nd ACM International Symposium on Mobile Ad Hoc Networking and Computing (MobiHoc '01), 2001, pp. 117-127.
Papadopouli, M. and Schulzrinne, H., "Seven Degrees of Separation in Mobile Ad Hoc Networks", In IEEE Global Telecommunications Conference (Globecom '00), vol. 3, San Francisco, CA, USA, Nov. 27, 2000, pp. 1707-1711.
Patwardhan, A., et. al., "Secure Routing and Intrusion Detection in Ad Hoc Networks", In Third IEEE International Conference on Pervasive Computing and Communications (PerCom 2005), Kauai Island, HI, USA, Mar. 8-12, 2005, pp. 191-199.
PC Engines, "Wireless Router Application Platform", Dec. 2006, available at: http://www.pcengines.ch/wrap.htm.
Perkins, C.E. and Johnson, D.B., "Route Optimization for Mobile IP", In Cluster Computing, vol. 1, No. 2, 1998, pp. 161-176.
Plazes Website, "FAQ-What's Plazes", Sep., 2006, available at: http://www.plazes.com/info/whatis/.
Porchdog Software, "Howl: Man's New Best Friend", May 2006, available at: http://www.porchdogsoft.com/products/howl/.
Ramani, I. and Savage, S., "Syncscan: Practical Fast Handoff for 802.11 Infrastructure Networks," In Proceedings of the Annual Joint Conference of the IEEE Computer and Communications Societies (INFOCOM 2005), vol. 1, Mar. 13-17, 2005, pp. 675-684.
Rigney, C., et. al., "Remote Authentication Dial in User Service (RADIUS)", Technical Report, RFC 2865, Jun. 2000.
Rosenberg, J., et. al., "SIP: Session Initiation Protocol", Technical Report, RFC 3261, Jun. 2002.
RSS 2.0 at Harvard Law, "RSS 2.0 Specification", Jul. 15, 2003, available at: http://blogs.law.harvard.edu/tech/rss.
Schosser, S., et. al., "Incentives Engineering for Structured P2P Systems—A Feasibility Demonstration Using Economic Experiments", In Proceedings of the 7th ACM Conference on Electronic Commerce (EC '06), Ann Arbor, MI, USA, Jun. 11-15, 2006, pp. 280-289.
Schulzrinne, H., and Wedlund, E., "Application-Layer Mobility Using SIP", In Mobile Computing and Communications Review, vol. 4, No. 3, 2000, pp. 47-57.
Shin, S., et. al., "Reducing MAC Layer Handoff Latency in IEEE 802.11 Wireless LANs", In Proceedings of the Second International Workshop on Mobility Management & Wireless Access Protocols (MobiWac '04), Philadelphia, PA, USA, Oct. 1, 2004, pp. 19-26.
Simone, D., "802.11k Makes WLANs Measure Up", Network World, Mar. 29, 2004.
Singel, R., "Meetro Eases Hookups in Your Hood", Wired.com, Sep. 29, 2005, available at: http://www.wired.com/culture/lifestyle/news/2005/09/69023.
SQLite Website, "SQLite", Dec. 2006, available at: http://www.sqlite.org/.
Stafford, B., "libESMTP", Dec. 2006, available at: http://www.stafford.uklinux.net/libesmtp.
Stefanov, A., and Erkip, E., "Cooperative Space-Time Coding for Wireless Networks", In IEEE Transactions on Communications, vol. 53, No. 11, Nov. 2005, pp. 1804-1809.
Sterne, D., et. al., "A General Cooperative Intrusion Detection Architecture for MANETs", In Proceedings of the Third IEEE International Workshop on Information Assurance, Mar. 23-24, 2005, pp. 57-70.
Stolfo, S.J., et al., "A Comparative Evaluation of Two Algorithms for Windows Registry Anomaly Detection", In Journal of Computer Security, vol. 13, No. 4, 2005, pp. 659-693.
Subhadrabandhu, D., et. al., "Efficacy of Misuse Detection in Adhoc Networks", In First Annual IEEE Communications Society Conference on Sensor and Ad Hoc Communications and Networks (SECON 2004), Santa Clara, CA, USA, Oct. 4-7, 2004, pp. 97-107.
Sun, B., et. al., "Alert Aggregation in Mobile Ad Hoc Networks", In Proceedings of the 2nd ACM Workshop on Wireless Security (WiSe '03), San Diego, CA, USA, Sep. 19, 2003, pp. 69-78.
Swish-e: Simple Web Indexing System for Humans-Enhanced Website, Dec. 2006, available at: http://www.swish-e.org/.
Tew, C., "The Fist P2P PVR from NDS Plus Innovative 'Distributed DVR'", Jan. 29, 2007, available at: http://www.pvrwire.com/2007/01/29/announcements-from-nds/.
TheoryOrg, "Bittorrent Protocol Specification 1.0", Dec. 2006, available at: http://wiki.theory.org/BitTorrentSpecification.
U.S. Appl. No. 12/092,224, filed Apr. 7, 2011.
U.S. Appl. No. 12/593,209, filed Nov. 23, 2009.
U.S. Appl. No. 60/732,019, filed Oct. 31, 2005.
U.S. Appl. No. 60/732,457, filed Nov. 1, 2005.
U.S. Appl. No. 60/739,137, filed Nov. 22, 2005.
U.S. Appl. No. 60/813,022, filed Jun. 13, 2006.
U.S. Appl. No. 60/852,449, filed Oct. 17, 2006.
U.S. Appl. No. 60/903,197, filed Feb. 22, 2007.
U.S. Appl. No. 60/920,240, filed Mar. 26, 2007.
Vali, D., et. al., "A SIP-Based Method for Intra-Domain Handoffs", In IEEE 58th Vehicular Technology Conference (VTC 2003-Fall), vol. 3, Oct. 6-9, 2003, pp. 2068-2072.
Vigna, G., et. al., "An Intrusion Detection Tool for AODV-Based Ad hoc Wireless Networks", In Proceedings of the 20th Annual Computer Security Applications Conference (ACSAC 2004), Dec. 6-10, 2004, pp. 16-27.
Wagner, D., and Soto, P., "Mimicry Attacks on Host-Based Intrusion Detection Systems", In Proceedings of the Ninth ACM Conference on Computer and Communications Security (CCS 2002), Washington, DC, USA, Nov. 18-22, 2002, pp. 255-264.
Wang, K., and Stolfo, S.J., "Anomalous Payload-Based Network Intrusion Detection", In Proceedings of the Seventh International Symposium on Recent Advances in Intrusion Detection (RAID 2004), Sep. 2004, pp. 203-222.
Wang, K., et al., "Anomalous Payload-Based Worm Detection and Signature Generation", In Proceedings of the 8th International Symposium on Recent Advances in Intrusion Detection (RAID'05), Sep. 2005, pp. 227-246.
Wongrujira, K., and Seneviratne, A., "Monetary Incentive with Reputation for Virtual Market-Place Based P2P", In Proceedings of the 2005 ACM Conference on Emerging Network Experiment and Technology (CoNEXT 2005), Oct. 24-27, 2005, pp. 135-145.
Written Opinion in International Patent Application No. PCT/US2006/042713, filed Oct. 31, 2006, mailed Apr. 9, 2008.
Written Opinion in International Patent Application No. PCT/US2007/022188, filed Oct. 17, 2007, mailed Apr. 22, 2009.
Written Opinion in International Patent Application No. PCT/US2008/058294, filed Mar. 26, 2008, mailed Aug. 21, 2008.
Wu, C.H., et al., "Bidirectional Route Optimization in Mobile IP Over Wireless LAN", In Proceedings of the 56th Vehicular Technology Conference (VTC 2002-Fall), vol. 2, 2002, pp. 1168-1172.
Yokota, H. et al., "Link Layer Assisted Mobile IP Fast Handoff Method Over Wireless LAN Networks", In Proceedings of the 8th Annual International Conference on Mobile Computing and Networking (MobiCom '02), Atlanta, GA, USA, Sep. 23-26, 2002, pp. 131-139.
Yuen, W.H. and Schulzrinne, H., "Performance Evaluation of Time-Based and Hop-Based TTL Schemes in Partially Connected Ad Hoc Networks", In IEEE International Conference on Communications (ICC '06), Jun. 2006, pp. 3844-3849.
Zero Configuration Networking (Zeroconf) Website, Dec. 2006, available at: http://www.zeroconf.org/.
Locasto, M.E., et al., "Collaborative Distributed Intrusion Detection", Technical Report CUCS-012-04, Department of Computer Science, Columbia University, Mar. 8, 2004.
Office Action dated Jul. 19, 2013 in U.S. Appl. No. 12/092,224.

\* cited by examiner

|  | Current AP (311) | Best AP (312) | Second Best AP (313) |
|---|---|---|---|
| BSSID (301) | MAC A | MAC B | MAC C |
| Channel (302) | Channel 6 | Channel 11 | Channel 1 |
| Subnet ID (303) | 160.39.5.0 | 160.39.10.0 | 160.39.10.0 |

FIG. 3

| To DS | From DS | Address 1 | Address 2 | Address 3 | Address 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

FIG. 8

```
v=0
o=Laura 289083124 289083124 IN IP4 five.example.com
t=0 0
c=IN IP4 131.160.1.112
a=group:FID 12 3
m=audio 30000 RTP/AVP 0
a=mid: 1
m=audio 30002 RTP/AVP 8
a=mid:2
m=audio 20000 RTP/AVP 0 8
c=IN IP4 131.160.1.111
a=mid:3
```

FIG. 9

METHODS, MEDIA, AND DEVICES FOR MOVING A CONNECTION FROM ONE POINT OF ACCESS TO ANOTHER POINT OF ACCESS

CROSS-REFERENCE TO RELATED APPLICATIONS

This application is a continuation-in-part of International Patent Application No. PCT/US2006/045000, filed Nov. 20, 2006, which claims the benefit under 35 U.S.C. §119(e) of U.S. Provisional Patent Application No. 60/739,137, filed Nov. 22, 2005, and U.S. Provisional Patent Application No. 60/813,022, filed Jun. 13, 2006, each of which is hereby incorporated by reference herein in its entirety.

TECHNICAL FIELD

The disclosed subject matter relates to systems, methods, media, and devices for moving a connection from one point of access to another point of access.

BACKGROUND

In wireless networks, mobile nodes (MNs) can move between, for example, access points (APs), sub-networks, and/or networks. When a MN moves out of the range of a first AP and enters the range of a second AP, a handoff from the first AP to the second AP can occur. These handoffs can be, for example, layer 2 (L2) handoffs and/or layer 3 (L3) handoffs. Moving from one AP to another can also involve an authentication process, between, for example, an MN and a network it is joining. The amount of time consumed by handoffs and authentication can slow down or interrupt traffic being sent to and from a, for example, MN when it moves from one network to another. Such interruptions can be especially problematic for real-time applications, such as, for example, voice-over-internet-protocol (VoIP) communications and streaming video, where the interruption can be noticeable to the user.

In some cases, the time needed by an MN to perform an L2 handoff can be on the order of a few hundred milliseconds, which can cause a noticeable interruption in, for example, an ongoing real-time multimedia session. Additionally, for example, in either open 802.11 networks or 802.11 networks with Wired Equivalent Privacy (WEP) enabled, scanning can contribute to over 90% of the total handoff time. In some systems, such as, for example, in 802.11 networks with either WPA or 802.11i enabled, the authentication process can dominate the handoff delay. This can be because data may not be exchanged among MNs before authentication completes. For example, using 802.1x, during authentication, only Extensible Authentication Protocol Over Local Area Network (EAPOL) traffic may be exchanged with a supplicant (e.g., a node attempting authenticate with an AP).

When an MN moves from one network to another, sometimes the MN can be required to obtain a new address, such as, for example, an IP address. This can be the case during, for example, an L3 handoff. New IP addresses can be obtained using, for example, Dynamic Host Configuration Protocol (DHCP). However, this can take up to, for example, one second, which can be long enough to cause a disruption in, for example, a video chat using an IP connection.

SUMMARY

Systems, methods, media, and devices for providing cooperation among digital processing devices in wireless networks are provided. In some embodiments, methods for moving a connection from one point of access to another point of access are provided, comprising: sending a request for information from a first mobile node to at least one other node, wherein the request for information contains first information identifying at least one point of access; receiving a response containing second information identifying at least one point of access from the at least one other node; and establishing a connection between the first mobile node and an point of access identified in the second information.

In some embodiments, methods for moving a connection from one point of access to another point of access are provided, comprising: sending a request for information from a first mobile node to at least one other node, wherein the request for information identifies a network; receiving a response identifying at least one node in the identified network; sending a request for an address to the at least one identified node; receiving a response containing the address; and establishing a connection between the first mobile node and a point of access in the identified network using the address.

In some embodiments, devices that can move a connection from one point of access to another point of access are provided, comprising: an interface in communication with a network; a memory; and a processor in communication with the memory and the interface; wherein the processor: sends a request for information to at least one node, wherein the request for information contains first information identifying at least one point of access; receives a response containing second information identifying at least one point of access from the at least one node; and establishes a connection with a point of access identified in the second information.

In some embodiments, devices that can move a connection from one point of access to another point of access are provided, comprising: an interface in communication with a network; a memory; and a processor in communication with the memory and the interface; wherein the processor: sends a request for information to at least one node, wherein the request for information identifies a network; receives a response identifying at least one node in the identified network; sends a request for an address to the at least one identified node; receives a response containing the address; and establishes a connection with a point of access in the identified network using the address.

In some embodiments, a computer-readable medium containing computer-executable instructions that, when executed by a processor, cause the processor to perform methods for moving a connection from one point of access to another point of access is provided. The methods comprising: sending a request for information from a first mobile node to at least one other node, wherein the request for information contains first information identifying at least one point of access; receiving a response containing second information identifying at least one point of access from the at least one other node; and establishing a connection between the first mobile node and a point of access identified in the second information.

In some embodiments, a computer-readable medium containing computer-executable instructions that, when executed by a processor, cause the processor to perform methods for moving a connection from one point of access to another point of access is provided. The methods comprising: sending a request for information from a first mobile node to at least one other node, wherein the request for information identifies a network; receiving a response identifying at least one node in the identified network; sending a request for an address to the at least one identified node; receiving a response containing the address; and establishing a connection between the first mobile node and a point of access in the identified network using the address.

BRIEF DESCRIPTION OF THE DRAWINGS

FIG. 3 is table illustrating contents of a cache that can be used in accordance with some embodiments of the disclosed subject matter.

FIG. 8 is table illustrating example relationships between some fields of the illustration of FIG. 7 that can be used in accordance with some embodiments of the disclosed subject matter.

FIG. 9 is an illustration of code according to RFC3388 Session Description Protocol format that can be used in accordance with some embodiments of the disclosed subject matter.

DETAILED DESCRIPTION

In some embodiments of the disclosed subject matter, systems and methods are provided to achieve, and/or increase the performance of, handoffs, such as, for example, L2 and L3 handoffs. In some embodiments, mobile nodes (MNs) can cooperate by, for example, exchanging information to assist each other. For example, an MN can discover surrounding points of access, such as, for example, access points (APs) and subnets by asking other MNs to provide, for example, a list of APs that they may have. In some embodiments, an MN can ask another MN (for example, an MN in a different subnet) to acquire a new address, such as, for example, an IP address, on its behalf. This can enable an MN to get, for example, an IP address for a new subnet while remaining in its current subnet. Thus, for example, if the MN moves to a new subnet for which it has already obtained an address, it does not have to waste time obtaining the address.

Some embodiments of the disclosed subject matter can use cooperation to authenticate MNs, by, for example, relaying traffic for MNs that have not yet completed authentication. Some embodiments can use cooperation to increase security by, for example, informing an MN than another MN has sent malicious and/or incorrect information. Some embodiments can reduce bandwidth and/or energy usage by, for example, reducing the amount of time an MN spends scanning. Some embodiments can improve load balancing by, for example, gathering, analyzing, and/or providing statistics about, for example, AP usage.

Figure 1:
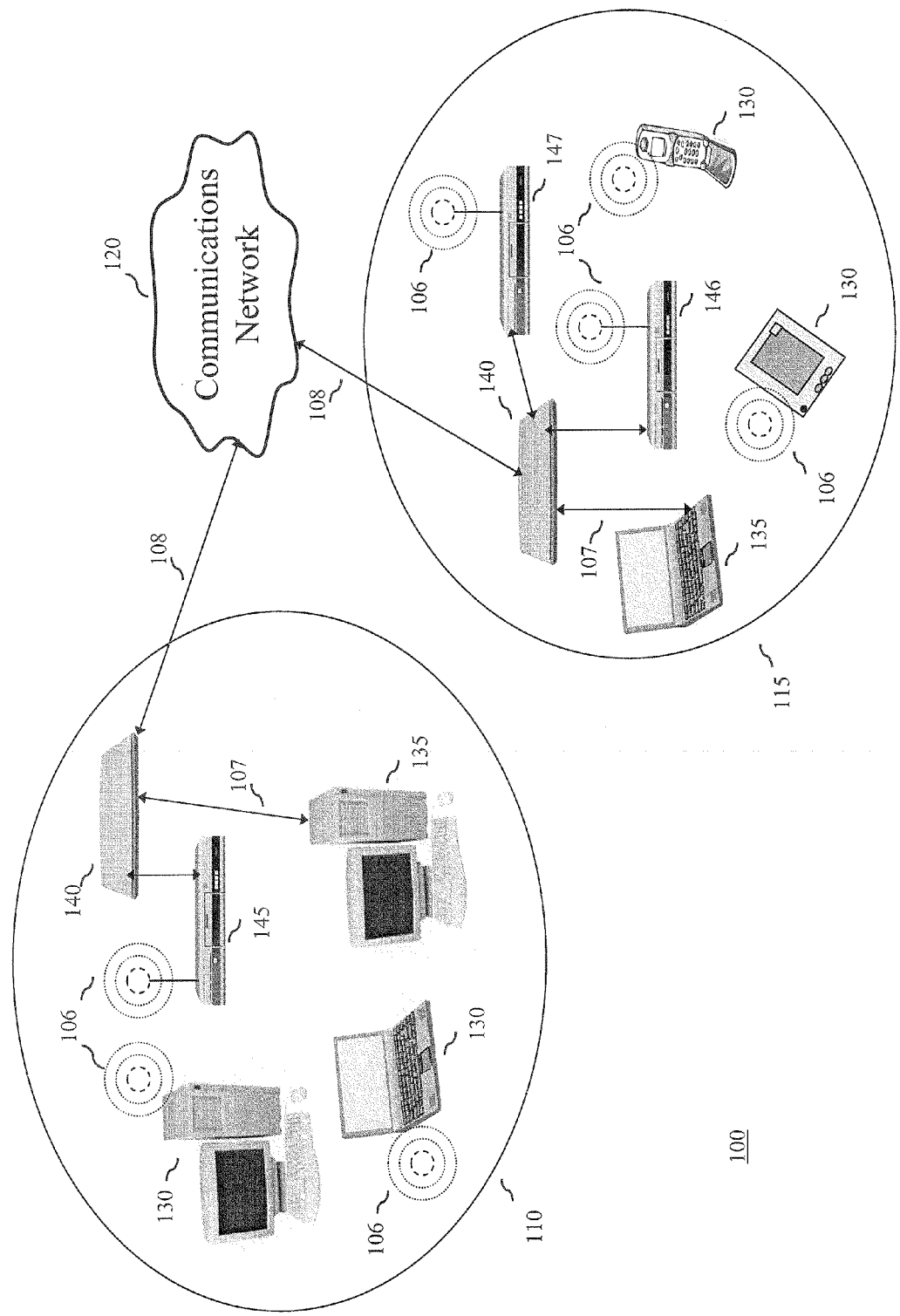
FIG. 1 is a schematic diagram of a system suitable for providing cooperation among digital processing devices in wireless networks in accordance with some embodiments of the disclosed subject matter.

FIG. 1 is a schematic diagram of an illustrative system 100 suitable for implementation of systems and methods for providing cooperation among digital processing devices in wireless networks in accordance with some embodiments of the disclosed subject matter. As illustrated, system 100 can include one or more nodes (MNs) 130. MNs 130 can be members of a network, such as, for example, subnets 110 and 115. Nodes 130 can be connected through wireless communication links 106 to wireless access points, such as, wireless access points 145-147 and/or a router 140. In some embodiments, a router 140 and a wireless access point 145-147 can be one device, such as, for example, a wireless router. In some embodiments, a wireless access point 145-147, a router 140, and/or a wireless router, may also include a switch. In some embodiments, routers 140 can be routers with multiple IP addresses and/or multiple network cards such as, for example, multi-homed routers. Nodes 130 can be any suitable digital processing devices, such as, for example, personal computers, laptop computers, data displays, Internet browsers, personal digital assistants (PDAs), two-way pagers, tablet personal computers, wireless terminals, digital audio players, digital video players, portable telephones (e.g., cellular telephones, voice-over-IP phones, 3G Cellular telephones, etc.), or any combination of the same.

Routers 140 can be connected through one or more communication links 108 to other networks such as, for example, communication network 120. Communications network 120 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a mobile ad-hoc network (MANET), a mesh network, a Third Generation (3G) wireless network, a Bluetooth network, an Ultra-wideband (UWB) network, or any combination of any of the same.

In some embodiments, a subnet can have more than one access point. For example, subnet 115 is illustrated with access points 146 and 147. In some embodiments, nodes 130 can communicate with each other and/or with other devices in communication with, for example, a network 120 and/or subnets 110 and 115, through an access point 145-147 and/or a router 140.

Subnets 110 and 115 can also include, for example, stationary nodes 135, which can be connected to a router 140 through, for example, one or more communication links 107. Nodes 135 can be any suitable digital processing devices, such as, for example, personal computers, laptop computers, mainframe computers, Internet browsers, personal digital assistants (PDAs), two-way pagers, wireless terminals, portable telephones, etc., or any combination of the same. Communications links 107 and/or 108 can be any communications links suitable for communicating data between digital data processing devices, such as network links, dial-up links, wireless links, hard-wired links, etc. Communication links 106 can be any wireless communication links suitable for communicating data between digital processing devices, such as, for example, 802.11b, 802.11g, and/or Third-Generation Cellular services.

In some embodiments, nodes 130 can communicate directly with each other, for example, by using direct wireless communication without the use of, for example, a wireless access point 145-147 or a router 140. In some embodiments, one network interface card can be used to communicate, for example, both directly with other nodes 130 and with an access point 145-147. In some embodiments, a node 130 can have more than one network interface card and can use, for example, a first network interface card to communicate with a wireless access point 145-147 and a second network interface cards to communicate with other nodes 130. In some embodiments, a node 135 can have, for example, one or more wired links connected to a router 140 and, for example, one or more wireless links for communicating with nodes 130. In some embodiments, a node 130 can be connected via a wireless link at some points in time and a wired link at other points in time. For example, a PDA can be connected via a wireless link while the user is away from his desk and can be connected via a wired link when connected to, for example, a base station.

In some embodiments, a node 130 can move, for example, from a subnet 110 to a subnet 115, possibly with the assistance of other nodes 130 or 135. In some embodiments, such moving can include a handoff. In some embodiments a handoff from one access point to another access point, in the same subnet, can be an L2 handoff. For example, if a node 130, in subnet 115, moves from access point 147 to access point 146 an L2 handoff can occur. An L2 handoff can allow a node 130 to keep the same network address (e.g., IP address) before and after a handoff. In some embodiments if a node 130 moves from one subnet to another, an L2 and L3 can occur. For example, if a node 130 moves from access point 146, in subnet 115, to access point 145, in subnet 110, an L2 and an L3 handoff can occur. In some embodiments, an L3 handoff can require a node 130 to obtain a new address, such as, for example, an IP address.

Figure 2:
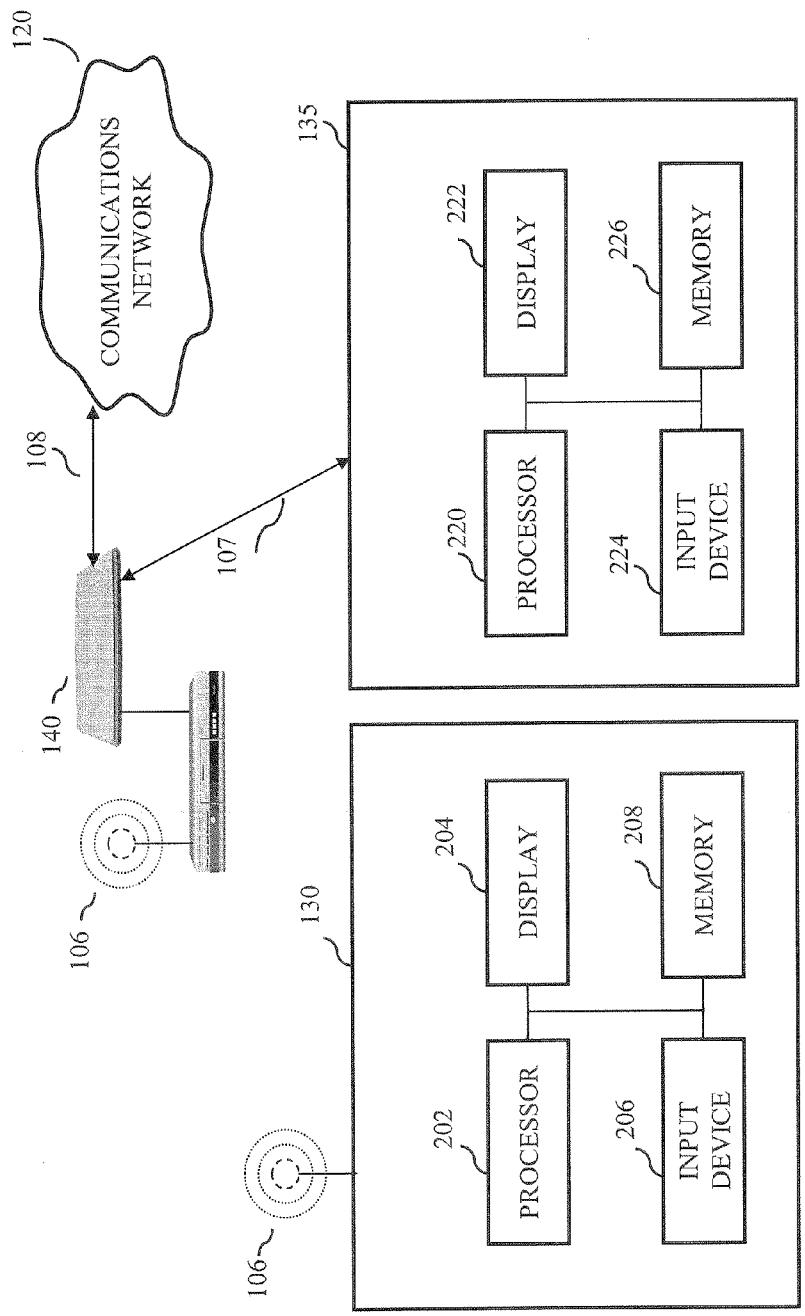
FIG. 2 is an illustration of nodes that can be used in FIG. 1 in accordance with some embodiments of the disclosed subject matter.

Nodes 130 and 135, which are depicted in FIG. 1, are illustrated in more detail in FIG. 2. Referring to FIG. 2, nodes 130 and 135 can include respectively, among other things, processors 202 and 220, displays 204 and 222, input devices 206 and 224, and memory 208 and 226, which can be interconnected. In one embodiment, memory 208 and 226 contain a storage device for storing a program for controlling processors 202 and 220. Memory 208 and 226 can also contain applications for providing cooperation among digital processing devices in wireless networks. In some embodiments, various applications can be resident in the memory of nodes 130 and/or nodes 135.

Variations and combinations of system 100 might be suitable for different embodiments of the disclosed subject matter. For example, some embodiments can include a client/server architecture where various nodes 130 and 135 are clients and/or servers. In addition, although the methods and systems of the subject matter are described herein as being implemented on a system 100, various embodiments of the disclosed subject matter can be implemented on any suitable platform. For example, in some embodiments a point of access can be incorporated with a gateway. Also, for example, a mobile node can connect to a network using any appropriate point of access. For example, in some embodiments the point of access can be, for example, an access point 145-147, a cellular tower, a base transceiver station (BTS), a radio access network (RAN), a base station controller (BSC), and/or a packet data serving node (PDSN). In some embodiments, a point of access, such as, for example, in a cellular network, can be connected directly to, for example, a communications network 120, a router 140, and/or an intermediate device connected to a communication network 120. In some embodiments, a unique identifier, such as, for example, a MAC address, can identify a point of access.

In some embodiments, an MN 130 can save information regarding the surrounding APs in a cache. When an MN 130 performs a handoff it can use valid entries in its cache, such as, for example, entries containing MAC addresses of nearby APs. An MN 130 can use this information to establish a connection with an AP and thus avoid scanning. In some embodiments, if an MN 130 does not have any valid information in its cache, the MN 130 can use an optimized scanning procedure, such as selective scanning, to discover new APs and build a cache. In the cache, APs can be ordered according to, for example, their signal strength as recorded at the time of scanning. This time can be, for example, immediately before an MN 130 changes its AP. Accordingly, in some embodiments, an AP with the strongest signal strength can be first in the list and an AP with the weakest can be last. By using a cache, for example, the L2 handoff time can be reduced to only a few milliseconds.

In some embodiments, a cache can be used, for example, to assist in an L3 handoff. For example, in addition to L2 information, an MN 130 can also cache L3 information, such as, for example, default gateway, subnet identifier, and an MN's IP address. In some networks, a subnet identifier can uniquely identify a subnet 110 or 115. Therefore, with knowledge of a subnet mask and default router's IP address, for example, the network address of a subnet, which can be used as subnet identifier, can be calculated. Caching the subnet identifier can allow a change of subnet to be detected faster. Additionally, an L3 handoff can be triggered when a new AP and old AP have different subnet identifiers. This can also allow for faster L3 handoffs, because, for example, an IP address and default gateway for the next AP and subnet can already be known and therefore can be used without delay.

Some embodiments of the disclosed subject matter can use, for example, the cache structure illustrated in FIG. 3, which can include, for example Basic Service Set Identifiers (BSSIDs) 301, which can be, for example, MAC addresses, channels 302, and subnet ID 303. Such information can corresponded to, for example, a current access point 311, an access point with the best perceived connectivity 312, and an access point with the second best perceived connectivity 313. Some embodiments can use, for example, a network address, such as an IP address, as a subnet identifier 303. Additional information, such as, for example, the last IP address used, lease expiration time, and/or a default router, can be extracted, for example, from a DHCP client lease file, which can be available in an MN 130 and possibly stored in a cache structure, such as, for example, the cache structure illustrated in FIG. 3.

Figure 4:
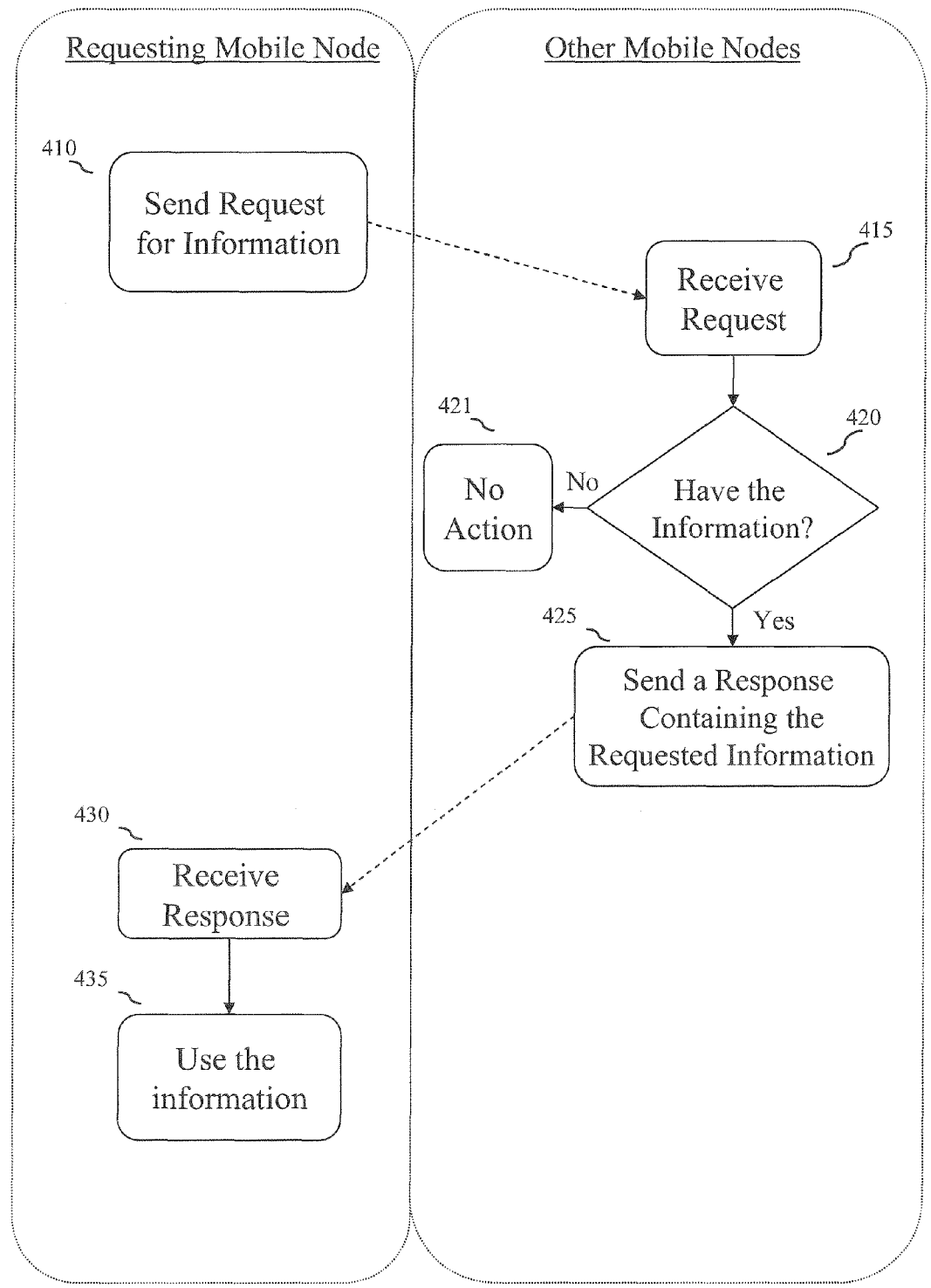
FIG. 4 is a simplified illustration of a method for providing cooperation among digital processing devices in accordance with some embodiments of the disclosed subject matter.

As illustrated in FIG. 4, in some embodiments, an MN 130 can acquire information about a network if, for example, it does not have valid information in the cache or if it does not have L3 information available for a particular subnet. In such a case, an MN 130 can ask other MNs 130 for the information so that the MN 130 does not have to find out about other APs by scanning. In order to share information, various MNs 130 can, for example, subscribe to the same multicast group. An MN 130 that needs to acquire information about, for example, its neighboring APs and subnets can be referred to as a requesting MN 130 (R-MN). An R-MN can ask other MNs 130 if they have such information by sending a request for information, at 410, for example, an information-request (INFOREQ) multicast frame. MNs 130 that receive such a request, at 415, can check, at 420, if they have the information that the R-MN has requested. If they do not have the information, they can ignore the request, at 421. If they have information, however, they can send a response, at 425, for example, an information-response (INFORESP) multicast frame, to the R-MN containing the information that the R-MN requested. The R-MN can receive the response, at 430, and use the information, at 435. For example, if an R-MN, which is connected to an access point 146 in subnet 115 of FIG. 1, wants to move its connection from access point 146 to another access point, it can request information from other mobile nodes 130, at 410. The R-MN can receive information, such as, for example, the MAC address of access point 147, at 430, and can and establish a connection, at 435, to access point 147, using this information. In some embodiments, the information received, for example, at 430, does not have to be the information requested, for example, at 410. For example, an R-MN can send a general request for information or a request for certain types of information. Other nodes (e.g, MN 130 and/or nodes 135) receiving such a request can determine whether and what information to respond with.

In some embodiments, for example, the information exchanged in INFOREQ and INFORESP frames can be a list of, for example, {BSSID, channel, subnet ID} entries. There can be, for example, one entry for each AP in an MN's cache of FIG. 3. As discussed, when an R-MN needs information about its neighboring APs and subnets, an INFOREQ multicast frame can be sent. The INFOREQ can contain the current content of the R-MN's cache, for example, the APs and subnets known to the R-MN. When an MN 130 receives, at 415, an INFOREQ frame, it can check, at 420, for example, if its own cache and the R-MN's cache have at least one AP in common. If the two caches have at least one AP in common and, for example, if an MN's cache has some APs that are not present in the R-MN's cache, the MN 130 can send, at 425, an INFORESP multicast frame containing the cache entries for the APs that are not in R-MN's cache. In some embodiments, an MN 130 whose cache contains APs in common with the cache of the R-MN, has likely been in a location near the R-MN. Such APs may have a higher probability of having the information the R-MN desires. In some embodiments, an MN 130 can send, for example, an INFORESP multicast frame even though its cache has no APs in common with the R-MN's cache. This can be controlled, for example, at the node and/or network level and may be based, for example, on network policy.

In some embodiments, an MN 130 can send an INFORESP frame, at 420, after waiting a random amount of time. For example, an MN 130 can check the information contained in INFORESP frames sent to the R-MN by other MNs 130 during a random wait time to determine, for example, if the information, sent by another MN 130, is the same information that it would have sent. If the information is the same, it can elect not to send a response. This can inhibit, for example, too many MNs 130 from sending the same information to the R-MN at the same time, which can be, for example, a waste of system resources and can cause, for example, unnecessary network traffic.

In some embodiments, when an MN 130, other than an R-MN, receives an INFORESP multicast frame, it can performs various tasks. For example, one possible task is a check of whether an MN 130 is providing incorrect information and if so, trying to fix it. Another possible task is to record the information provided by the INFORESP in its cache. By collecting unsolicited information, an MN 130 can build, for example, a bigger cache in less time and in a more efficient manner that requires less frame exchanges. In order to, for example, improve efficiency and further minimize frame exchange, MNs 130 can also collect information contained in the INFOREQ frames.

In some embodiments, when performing an L3 handoff, an MN 130 can change its subnet and acquire a new IP address.

A change of subnet can be detected by comparing the cached subnet identifiers for the old and new AP, when an L2 handoff occurs. If a change in subnet is detected, the MN 130 can acquire a new IP address for the new subnet. In some embodiments, such as, for example, if a node cannot obtain information it needs by requesting that information from other nodes, a new IP address can be acquired, for example, by using a DHCP infrastructure.

In some embodiments, an MN 130 can acquire a new IP address for a new subnet while remaining in its current subnet. For example, an MN 130 in subnet 115, can acquire an IP address for subnet 110, while still remaining in subnet 115. When an R-MN needs to perform a L3 handoff, it can determine which other MNs 130 in the new subnet can provide assistance. A MN 130 providing assistance can be referred to as an assisting MN (A-MN). An R-MN can ask an A-MN to, for example, acquire a new IP address on its behalf. The A-MN can acquire the new IP address, for example, using DHCP and can send the IP information to the R-MN. The R-MN can use this information to update, for example, its IP address and/or multimedia session before the actual L2 handoff. Therefore the handoff can be accomplished with reduced delay.

Figure 5:
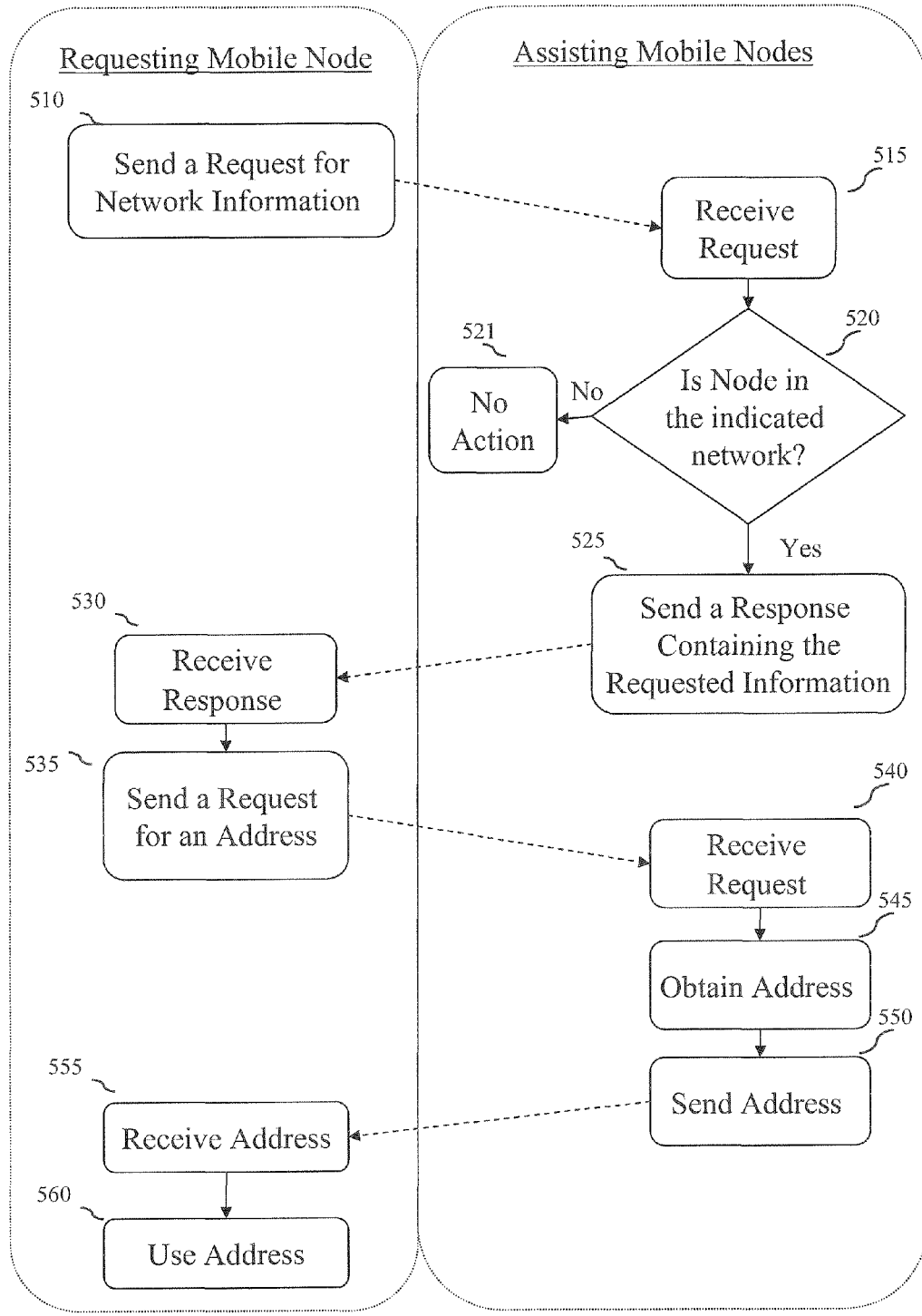
FIG. 5 is another simplified illustration of a method for providing cooperation among digital processing devices in accordance with some embodiments of the disclosed subject matter.

Using IP multicast, for example, an MN 130 can communicate with other MNs 130 in various subnets. For example, as illustrated in FIG. 5, an R-MN 130, in for example, subnet 115, can send a request for information, at 510, for example, an assisting-mobile-node-discover (AMNDISCOVER) multicast packet containing, for example, a new subnet ID. Other MNs 130 can receive the request, at 515, and check, for example, the subnet ID to determine, at 520, whether they are in the specified subnet, for example, subnet 110. If not, they can ignore the request, at 521. If so, they can reply, at 525, with, for example, an assisting-mobile-node-response (AMNRESP) unicast packet. This packet can contain, for example, the A-MN's gateway information (e.g., its default router's IP address), MAC address, and IP address. The R-MN can receive this information, at 530, and use it to build a list of available A-MNs for that particular subnet, for example, subnet 110. When an R-MN knows which A-MNs are available in the new subnet, it can cooperate with them in order to acquire L3 information (e.g., a new IP address, router information).

For example, when an R-MN needs to acquire a new IP address for a particular subnet, it can send, for example, at 535, a unicast internet-packet request (IPREQ) packet to an available A-MN for that subnet. Such a packet can contain, for example, the R-MN's MAC address. An A-MN can receive, at 540, for example, an IPREQ packet, and can extract information, such as, the R-MN's MAC address, from the packet and start, for example, a DHCP process by inserting the R-MN's MAC addressor in the CHaddr field of DHCP packets. In some embodiments, the cliet-ID field can be used instead of the CH addr field. The A-MN can also set the broadcast bit in DHCP packets for it to receive DHCP packets with a MAC address other than its own. This can allow the A-MN to acquire a new IP address, at 545, on behalf of the R-MN. In some embodiments, this process can be transparent to the DHCP server. Once, for example, the DHCP process has been completed, the A-MN can send, at 550, an IPRESP multicast packet containing, for example, the gateway information for the new subnet, the R-MN's MAC address, and the new IP address for the R-MN. The R-MN can receive the response, at 555, and, for example, check the MAC address in the IPRESP packet to verify that the packet is not for a different R-MN. The R-MN can save the new IP address together with the new gateway information.

In some embodiments, an R-MN can considering moving to one of multiple subnets. In doing so, it can build a list of, for example, {gateway, IP address} pairs (e.g., one pair for each one of the possible next subnets). After moving to a new subnet, the R-MN can renew the lease, at 560, for the new IP address, that was reserved for it, at 545, in the selected subnet. Because IP addresses can be reserved before an R-MN moves to a new subnet, in some embodiments, a waste of IP addresses can be created that may threaten to limit the available IP pool. However, a lease time in a mobile environment is typically short enough to provide a sufficient re-usage of IP addresses. Additionally, some embodiments can set the lease time to influence and/or control the waste of IP addresses.

Some embodiments can acquire an IP address from a subnet, other than the subnet that the IP address is for. This can be done by using, for example, a new DHCP option. In such embodiments, an MN 130 can ask the DHCP server for an IP address for a specific subnet. This can require changes to the DHCP protocol, such as, for example, a new option field defined in a DHCP packet (e.g., discover, request, etc.). The value of such an option can be, for example, a subnet identifier identifying a subnet for which an address is desired. In some embodiments, a packet can be relayed by a relay agent and a DHCP server can assign an IP address for a subnet whose identifier is specified in a new field instead of, for example, the subnet specified by the relay agent's IP address.

Some embodiments of the disclosed subject matter provide cooperative approaches for authentication in wireless networks. Some embodiments of the disclosed subject matter can use the 802.1x framework used in, for example, Wi-Fi Protected Access (WPA) and 802.11i. However, any appropriate authentication mechanism can be used, such as, for example, VPN, IPsec, or 802.1x. As known in the art, a property of a wireless medium in IEEE 802.11 networks is that the medium can be shared and that an MN 130 can hear packets that other stations (STAs) send and receive. This can be true when MN 130 and STAs are connected to the same AP (i.e., when they are on the same channel). In some embodiments, an STA can be, for example, but is not limited to, an MN 130, a node 135, and/or appropriate devices.

Figure 6:
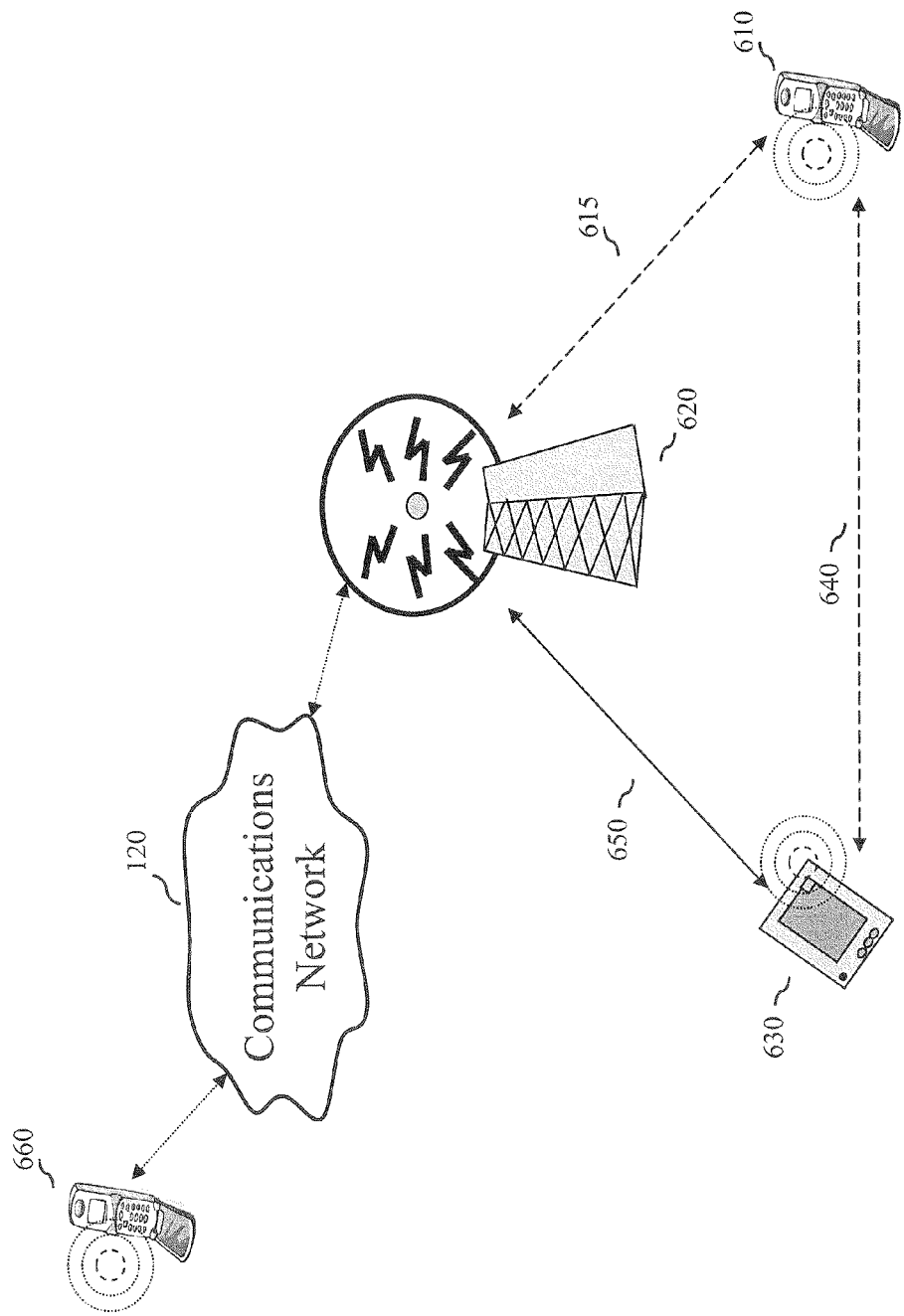
FIG. 6 is schematic diagram of an illustrative system where a digital processing device can relay data for another digital processing device in accordance with some embodiments of the disclosed subject matter.

For ease of explanation, it can be assumed that one authenticator can manage an entire subnet such that authentication can be required after each L3 handoff. In such a scenario, a subnet can be referred to as an Authentication Domain (AD). In some embodiments, an MN 130 can share the information about ADs in the same way it can share information about subnets. In doing so, an MN 130 can know whether the next AP and the current AP belong to the same AD. In some embodiments, an MN 130 can perform handoffs and authentication, a Correspondent Node (CN) can have an established multimedia session with the MN 130, and a Relay Node (RN) can relay packets for the MN 130. In some embodiments, available RNs for a particular AD can be discovered following the same or similar procedure to the one described above for the discovery of A-MNs In some embodiments an RN and R-MN may be connected to the same AP after the handoff. In such scenarios, it may be assumed that RNs are a subset of the available A-MNs. As illustrated in FIG. 6, while an MN 130, such as R-MN 610, is going through authentication in a new AD, it can continue to communicate with a CN 660 via the RN 630, which can relay packets to and from the R-MN 610. For example, R-MN 610 can perform authentication, at 615, with an access point 145-147, such as access point 620. While authentication 615 is being performed, another mobile node 130, such as RN 630, can relay data packets, at 640 and 650, which can be going to and from a CN 660, between the access point 620 and the mobile node 610. In some embodiments, an RN 630 can route traffic to and from an access point 620 and a R-MN 610, if R-MN 610 is not communicating with other devices, such as, for example, CN 660.

In some embodiments, when an MN 130 is going to change AD, it can select an RN from a list of available RNs for the new AD/AP and can send a relay-request (RELAYREQ) multicast frame to the multicast group. The RELAYREQ frame can contain, for example, the MN's MAC address, the CN's IP address, and the selected RN's MAC and IP addresses. The RELAYREQ can be received by all the STAs subscribed to the multicast group and, in particular, both the CN and the RN can receive it. In some embodiments, such as, for example, in congested environments where smaller TTL values may be preferred, a separate unicast RELAY_REQ frame can be sent to a CN. After performing the handoff, the MN 130 may need to authenticate before it can resume communication via the AP. However, because of the shared nature of the medium, the MN 130 can start sending packets to the RN as if it was already authenticated. Although, the authenticator may drop the packets, the RN can observe the packets on the medium and relay them to the CN using its own encryption keys. The CN can be aware of the relaying because of the RELAYREQ, and thus it can start sending packets for the MN 130 to the RN as well. For example, while an RN 630 is relaying packets to and from an MN 610, the MN 610 can perform its authentication, at 615, via, for example, 802.1x or any other appropriate mechanism. Once the authentication process is complete and the MN 610 has access to the infrastructure, the packets can stop being relayed and instead can be sent using normal communication via an AP 620. When a CN 660 starts receiving packets from the MN 610 via an AP 620, it can stop sending packets to the RN 630 and can resume normal communication with the MN 610. The RN 630 can detect that it does not need to relay packets for the MN 610 and can return to normal operation. In some embodiments, links 640 and 650 can be, for example, maximum bit-rate links.

In some embodiments, for example, embodiments using WPA and/or 802.11i, an R-MN 610 and RN 630 may have to exchange unencrypted L2 data packets for the duration of the relay process. By responding to an RN discovery, RNs can implicitly agree to provide relay for such frames. Such a relaying of unencrypted L2 frames may not represent a security concern since packets can still be encrypted at higher layers and since the relaying happens for a limited amount of time.

In some embodiments, by using a relay, the bridging delay in the L2 handoff can be removed or reduced. After an MN 130 changes AP, a switch, for example, can continue sending packets for the MN 130 to the old AP until it updates the information regarding the new AP on its ports. When a relay node is used in the new AP, this relay node can already be registered to the correct port on the switch, therefore an update may not be required on the switch side and the MN 130 can immediately receive packets via the RN.

Figure 7:
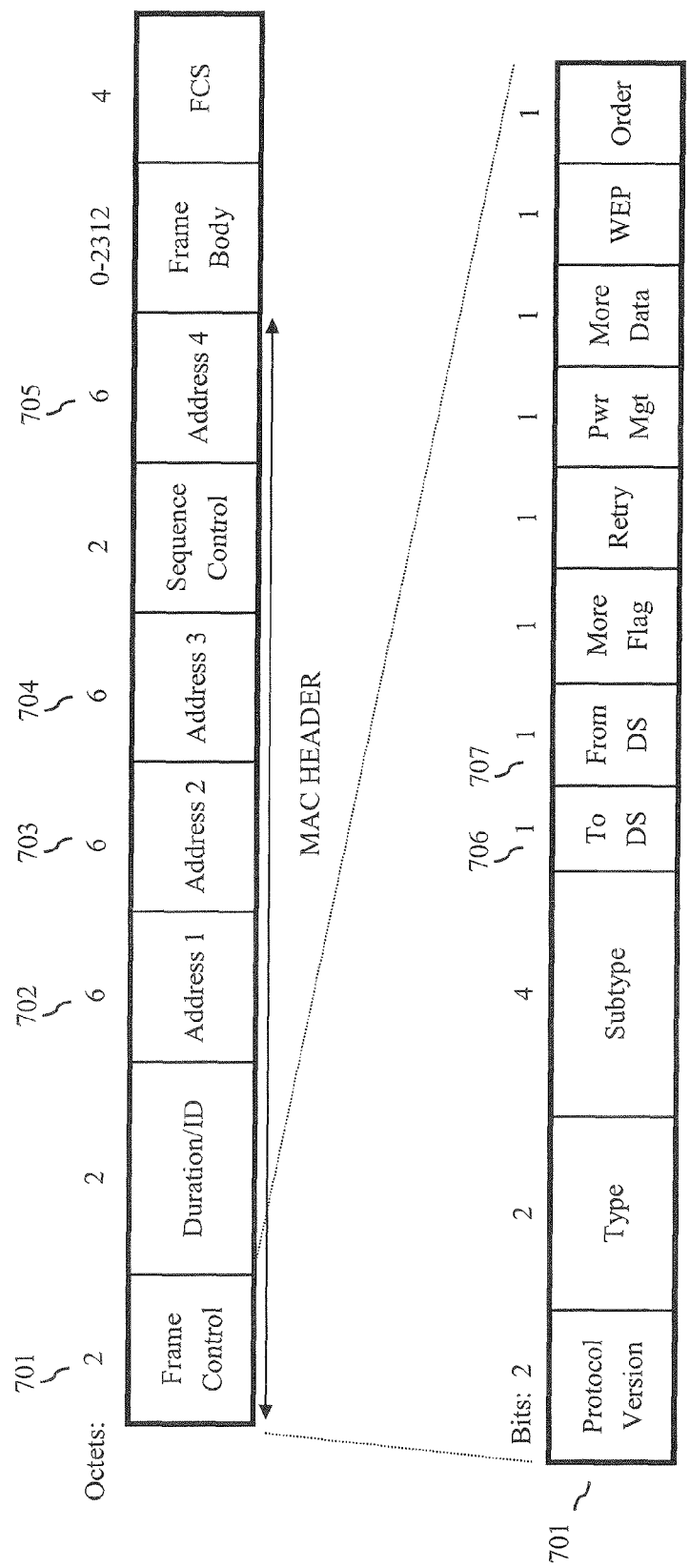
FIG. 7 is an illustration of an IEEE 802.11 MAC layer frame that can be used in accordance with some embodiments of the disclosed subject matter.

The relaying described above can be performed using any appropriate system and/or method. For example, FIG. 7 illustrates the format of a general IEEE 802.11 MAC layer frame. FIG. 7 contains, for example, frame control field 701 and four Address fields 702-705. It also illustrates the To DS field 706 and From DS 707 field, which are part of the Frame Control field 701, for example, can be involved in the relaying process. The To DS field 706 can be set to one in data frames that are sent to a Distribution System (DS). The From DS field 707 can be set to one in data frames exiting the DS. The four Address fields 702-705 can have different meanings according to the particular combination of the To DS 706 and From DS 707 fields. The table of FIG. 8 illustrates the correspondence of the Address fields 702-705, in some embodiments, to each combination of the To DS 706 and From DS 707 fields. The elements appearing in the table are: Destination Address (DA), Source Address (SA), Basic Service Set Identifier (BSSID), Receiver Address (RA) and Transmitter Address (TA).

In infrastructure mode, for example, when an MN 130 sends a packet, this packet can be sent first to the AP, even if both the source and the destination are associated to the same AP. For such packets, the MN 130 can set the To DS bit. Other MNs 130 on the same channel can hear the packet but discard it because, as the To DS field and the Address fields indicate, such a packet is meant for the AP. When the AP sends a packet to an MN 130, it can set the From DS bit. MNs 130 that hear this packet, can discard it, except for the targeted MN 130. When both fields, To DS and From DS, have a value of one, the packet can be sent from one AP to another. In ad-hoc mode, for example, both fields can have a value of zero and the frames can be directly exchanged between MNs with the same Independent Basic Service Set (IBSS).

In some embodiments of the disclosed subject matter, ad-hoc mode and infrastructure mode do not have to be exclusively used, but rather can complement each other. For example, in some embodiments, MNs 130 can send ad-hoc packets while in infrastructure mode so that other MNs 130 on the same channel can receive such packets without involving an AP. Such packets can use, for example, the 802.11 ad-hoc MAC addresses. For example, both fields, To DS 706 and From DS 707, can have a value of zero and the Address fields 702-705 can be set accordingly as specified in FIG. 8. In doing so, MNs 130 can directly send and receive packets to and from other MNs 130 without involving an AP and without having to switch to ad-hoc mode.

Such embodiments can enable an RN to relay packets to and from an R-MN without significantly affecting any ongoing multimedia session that the RN might have via the AP. Such embodiments can be useful, for example, in scenarios where an MN 130 in infrastructure mode needs to communicate with MNs 130 in ad-hoc mode and a continuous change between infrastructure mode and ad-hoc mode is either impossible or inconvenient.

Some embodiments of the disclosed subject matter can provide security in wireless environments, including, for example, to nodes that are roaming and/or involved in hand-offs. One security issue, for example, is that a malicious user can try to propagate false information among cooperating MNs 130. For example, a malicious user might want to re-direct STAs to fake APs where their traffic can be sniffed and private information can be compromised. Additionally, for example, a malicious user might try to perform DoS attacks by redirecting STAs to far-away or non-existing APs. This can cause an STA to fail its association to an AP during a handoff process. The STA may then have to rely on the legacy scanning process to re-establish network connectivity. Another possibility is that at L3, for example, a malicious user might behave as an A-MN and attempt to disrupt a STA's service by providing, for example, invalid IP addresses.

Some embodiments can work on top of other security mechanisms deployed in a wireless network (e.g., 802.11i, WPA). In some embodiments, in order for a malicious user to send and receive packets from and to the multicast group, it at least has to have, access to the network and thus be authenticated. In such a scenario, a malicious user can be an STA with legal access to the network. Accordingly, MAC spoofing attacks may not be possible because a change in MAC address can require a new authentication handshake with the network. This also can mean that once the malicious user has been identified, it can be isolated.

Because an INFORESP frame can be multicast, an MN 130 that has the same information as the one contained in such a frame can check that the information is correct. If an MN 130 finds out that an INFORESP frame contains wrong information, it can send an information-alert (INFOALERT) multicast frame. Such a frame can contain the MAC address of the suspicious STA. This frame can also be sent by, for example, an R-MN that has received a wrong IP address and can contain the MAC address of the A-MN that provided that IP address. If more than one node, for example, triggers an alert for the same suspicious node, the suspicious node can be considered malicious and the information it provides can be ignored.

In some embodiments, one single INFOALERT may not trigger a response. In order for an MN 130 to be categorized as bad, in some embodiments, there may have to be a certain number of INFOALERT multicast frames sent by different nodes, all regarding the same suspicious MN 130. This certain number can be configured according to, for example, perceived threat to the system, the history of attacks, and/or security preferences. However, in some embodiments, it may have to be more than one. For example, if a node receives five INFOALERT multicast frames from five different nodes regarding the same MN 130, it can mark the MN 130 as bad. This mechanism can be compromised, however, if, for example, a malicious user spoofs five different MAC addresses or if there are five different malicious users that are correctly authenticated in the wireless network and that coordinate their attacks. Choosing a large number of INFOALERT frames required to mark a node as malicious can have advantages and disadvantages. For example, it can provide greater protection against exploitation of some embodiments using DOS attacks because the number of malicious users trying to exploit INFOALERT would likely be higher in DoS attack, than in other types of attacks. On the other hand, for example, some embodiments requiring a large number of INFOALERTS may not reach, or take a longer time than may be desired, to reach the required number of INFOALERTS. In some embodiments, an MN 130 targeted by a malicious user can recover from an attack by using mechanisms such as, for example, active scanning and/or DHCP address acquisition.

Some embodiments can improve the security of authentication. For example, some embodiments provide countermeasures to prevent exploitation of a relay mechanism. One concern in having an STA relay packets for an unauthenticated MN 130 is that the MN 130 can try to repeatedly use the relay mechanism and not authenticate to the network. Various systems and methods can inhibit this behavior. For example, a RELAYREQ frame can allow an RN to relay packets for a limited amount of time. The time can be configurable and can be set to the amount of time needed by an MN 130 to perform authentication, for example. After this time has passed, the relaying can be stopped. Additionally, an RN can relay packets only for those nodes that have sent a RELAYREQ packet to it. Also, because RELAYREQ packets can be multicast, nodes in the multicast group can detect bad behavior, such as, for example a node repeatedly sending RELAYREQ frames. Upon detecting such behavior, nodes can, for example, ignore RELAYREQ packets from the suspicious node or nodes.

In some embodiments, security measures can rely, in part, on knowing the identity of a node. Attacks that hide the true identity of a malicious node, for example, a MAC spoofing attack, can be inhibited by using appropriate systems and methods, such as, for example WPA or 802.11.

In some embodiments, before an RN can relay packets for an MN 130, it may need to receive the proper RELAYREQ packet from the MN 130. An MN 130 can send such a packet while it is still connected to the old AP. Accordingly, the MN 130 can be authenticated with the old AP to send such a packet. Furthermore, once the relaying timeout has expired, the RN can stop relaying packets for that MN 130. At this point in time, if the MN 130 can change its MAC address, it would not be able to send a new RELAYREQ because it has to first authenticate again with the network (e.g., using 802.11i) and therefore relaying may not take place. In embodiments in which the old AP belongs to an open network, a malicious node may perform MAC spoofing and exploit the relay mechanism in order to, for example, gain access to the secure network. Such attacks can be prevented by securing the multicast group, for example, by performing authentication and encryption at the multicast group level.

Some embodiments of the disclosed subject matter can be used with Session Initiation Protocol (SIP). As known in the art, SIP can be used, among other things, to update new and ongoing media sessions. In particular, the IP address of one or more of the participants to the media session can be updated. In some embodiments of the disclosed subject matter, after an MN 130 performs an L3 handoff, a media session update can be required to inform the various parties about the MN 130's new IP address. For example, some embodiments can perform an SIP session update to support cooperative authentication when, for example, a CN does not support cooperation. This can arise when, for example, an MN 130 establishes a streaming video session with a stream media server. Because a media server may not support cooperation, it may not receive RELAYREQ frames. Therefore, the media server may not be aware that packets should be sent for a limited amount of time via an RN. In some embodiments, only an MN 130 and RN may be aware of the relaying. However, in order to support mobility at the application layer for an ongoing multimedia session, an SIP session update can be performed. This can be done when, for example, an MN 130 has changed its IP address and needs to inform the media server of this change. The MN 130 can send a re-INVITE to the media server. The re-INVITE can include, in its Session Description Protocol (SDP), the IP address of the RN. In this way, the media server can update its media session and can start sending packets to the RN. Relay can then take place as described above. Once the relaying is over, if the MN's 130 authentication was successful, the MN 130 can send a second re-INVITE, including its new IP address. Otherwise, when the timeout for relaying expires, the relaying process can stop and the RN can terminate the media session with the media server. In some embodiments, the re-INVITE can be sent before the L2 handoff, while the MN is still using, for example, the old IP address.

Some embodiments can achieve application layer handoffs using, for example, SIP. One issue with application layer mobility is that an SIP handshake (e.g., re-INVITE=>200 OK=>ACK) can take a few hundred milliseconds to complete, which can exceed the requirements of seamless handoff for real-time media. A second issue is that the direction, in which an MN 130 is going to move, may be unknown. Systems and methods that enable an MN 130 to start the application layer handoff before the L2 handoff, and to do it so that the MN 130 does not move to the wrong AP or subnet after updating the session, can be used. Furthermore, the systems and methods can also work if the MN 130 decides not to perform the L2 handoff after performing the session update.

To accomplish this, systems and methods of the disclosed subject matter can use an SIP mobility mechanism. In particular, an extension of the above-described relay mechanism can be used. Assuming that the MN 130 performing a handoff has already acquired the necessary L2 and L3 information, the MN 130 can have a list of possible RNs and IP addresses to use, one for each of the various subnets it could next move to. In some embodiments, at this point in time, and before performing a L2 handoff, the MN 130 can update its multimedia session. The up-link traffic may not be an issue because the MN 130 already has a new IP address to use and it can start sending packets via the RN after the L2 handoff. The downlink traffic may be an issue because a CN can continue sending packets to the MN 130's old IP address since it is not aware of the change in the MN's IP address until the session has been updated. To address this, some embodiments can update the session so that the same media stream can be sent, at the same time, to the MN 130 and to the RNs in a list previously built by the MN 130. In this way, regardless of which subnet/AP the MN 130 moves to, the corresponding RN can relay packets to it. If the MN 130 does not change AP, nothing is lost because the MN 130 can still receive packets from the CN. After the MN 130 has performed the L2 handoff and has connected to one of the RNs, it can send a second re-INVITE via the RN so that the CN can send packets to the current RN, without involving the other RNs any longer. Once the authentication process successfully completes, communication via the AP can resume. An additional session update can be required so that the CN can send packets directly to the MN 130 without an RN in between.

To send multiple copies of the same media stream to different nodes (i.e., nodes apart from an MN 130 performing the handoff and its RNs), the MN 130 can send a CN a re-INVITE with a Session Description Protocol (SDP) format such as the one described in RFC 3388 and illustrated in FIG. 9. In this format, multiple m lines can be present with multiple c lines and can be grouped together by using the same Flow Identification (FID). A station receiving a re-INVITE with an SDP part, as illustrated in FIG. 9, can send an audio stream to a client with, for example, IP address 131.160.1.112 on port 30000 (if the PCM u-law codec is used) and to a client with, for example, IP address 131.160.1.111 on port 20000. So that the same media stream can be sent to different clients at the same time, all the clients can support the same codec. In some embodiments, RNs can relay traffic to MNs 130 yet not play such traffic. Because of this, an RN can support any appropriate codec during the relay process. Hence, a copy of the media stream can be sent to an RN by using, for example, an appropriate Session Description Protocol (SDP) format.

In some embodiments of session updates, as described above, buffering may not be necessary. In some embodiments, the L2+L3 handoff time may be on the order of 15 ms for open networks, which can be less than the packetization interval for typical VoIP traffic. When authentication is used, the total L2+L3 handoff time can be on the order of 21 ms. In both cases, packet loss can be negligible, hence buffering of packets can be unnecessary.

Some embodiments of the disclosed subject matter can improve bandwidth and energy usage. In some embodiments, because MNs 130 can share information, they do not have to, or have to perform less of, individual tasks that can consume a considerable amount of bandwidth and energy, such as, for example, scanning. In some embodiments, bandwidth usage and energy expended can be mainly affected by the number of multicast packets that each client sends to acquire the information it needs. The number of multicast packets can be proportional to the number of clients supporting cooperation that are in a network. In some embodiments, the presence of more clients can introduce more requests and more responses.

However, in some embodiments, the more clients that support cooperation, the more information a client can collect with a request, thus requiring fewer requests to be sent. That is, because an MN 130 can collect more data with each packet, overall it may need to send fewer packets. In some embodiments, for example, where INFORESP frames are multicast frames, MNs 130, besides the MN 130 that sent a request, can benefit from the response. This can reduce the amount of packet exchange, such as, for example, the number of INFOREQ packets sent.

In some embodiments, sending a few long packets can be more efficient than sending many short ones. As explained, for example, in the discussion of FIGS. 3 and 4, the information included in an INFOREQ or INFORESP packet can be a cache entry, for each AP, that can be a set of {BSSID, Channel, Subnet ID}, which, in some embodiments, can be a total size of 14 bytes (6+4+4). Considering that, in some embodiments, a maximum transmission unit (MTU) size can be 1500 bytes, a cache entry can take about 14 bytes, and IP and UDP headers can take a total of 28 bytes, an INFOREQ or INFORESP packet can carry information, in some embodiments, for no more than approximately 105 APs, for a total of about 1472 bytes. Because, as known in the art, 105 APs is likely more than one MN 130 will encounter, embodiments that provide cache space for, for example, approximately 105 APs, can provide good performance and a low number of cache misses. This is also true because many MN 130's can spend a large amount of time at or near their home location. However, various embodiments can provide various cache sizes. For example, in some embodiments, a cache that can store less than 105 APs, for example, a cache that stores only 16 APs, can be adequate.

Some embodiments of the disclosed subject matter can improve load balancing. In some embodiments, an MN 130 can gather statistics about APs that it may move to. An MN 130 can predict which APs it may move to by, for example, using the list of APs in its cache. An MN 130 can ask other MNs 130 to send statistics about these APs. The statistics can include, for example, available throughput, bit-rate, packet loss, and/or retry-rate. An MN 130 can use these statistics to determine, for example, which APs are more congested than others and which can support a certain, and perhaps required, Quality-of-Service (QoS). The MN 130 can select an AP to move to based in part on these determinations. Such embodiments can, for example, even out a distribution of traffic among, for example, neighboring APs and/or improve the utilization of an APs bandwidth.

Some embodiments of the disclosed subject matter can use multicast packets, such as, for example, UDP-over-IPv4 multicast packets or multicast scopes in, for example, an IPv6 network. In some embodiments, different values for time-to-live can be used depending on, for example, how far multicast packets are desired to reach into an IP network. In some embodiments, the density of MNs 130 supporting cooperation can be used in deciding how to share information among MNs 130. In some embodiments, if an MN 130 does not receive a response after sending a request with a time-to-live value of 1 (e.g., same subnet), it can send the same request again but with a time-to-live value of 2 (e.g., next subnet). This process can continue to other subnets by, for example, continuing to increase the time-to-live value. In some embodiments, the probability of an MN 130 finding the information it needs can decrease as the search moves to more distant subnets. On the other hand, some embodiments can use a short time-to-live value to limit the propagation of multicast frames in congested environments.

Some embodiments of the disclosed subject matter can enable various MNs 130 to subscribe to multiple multicast groups. Each of the multiple multicast groups can be restricted to, for example, a subnet, an Extended Service Set (ESS), or a Basic Service Set (BSS). In some embodiments, an MN 130 can cache its multicast address and share it with other MNs 130 in the same way MNs 130 can share other information, such as subnetID. In some embodiments, each MN 130 can compute its own multicast address and multicast addresses of other MNs 130 using a hash of one or more parameters, such as a current BSSID and/or subnetID. In doing so, each MN 130 can compute the multicast address of another MN 130 based on knowing, for example, the current BSSID and/or subnetID of the other MN 130.

Some embodiments of the disclosed subject matter can use alternatives to multicasting, such as, for example, ad-hoc networks. In some embodiments, MNs 130 can exchange L2 and L3 information contained in their cache by relaying packet, using systems and methods, such as those described, for example, in the discussion of FIGS. 6-8. Some embodiments, such as those, for example, where an MN 130 has two wireless cards, can use one card to connect to the ad-hoc network and share information with other MNs 130 while the other card remains connected to the AP. Some embodiments can use cards of various technologies. For example, some embodiments can use one card to connect to, for example, an 802.11 network, and another card to connect to, for example, a cellular network. In some embodiments, such as those using ad-hoc networks, the infrastructure network may not require any changes and/or support. For example, in some congested and densely populated environments, ad-hoc networks can be an effective solution. However, in some embodiments with a scarce population of MNs 130, where each MN 130 may only be able to see a very small number of other MNs 130, an ad-hoc network may not be the best choice. An ad-hoc approach may also not be ideal where an R-MN acquires a new IP for the new subnet while still in the old subnet.

Some embodiments can reduce the use of multicast packets by changing an infrastructure network. In such embodiments, a new presence service, in which each subnet can be a presentity and/or provide presence information, can be introduced. Each subnet can have contact list of the A-MNs available in that subnet so that the presence information can be represented by the available A-MNs in the subnet. If, for example, an R-MN subscribes to this service, it can receive presence information about the new subnet, such as, for example, its contacts, which can be the available A-MNs in that subnet. Such embodiments can be more efficient, if, for example, a small number of users support cooperation.

In some embodiments, such as those, for example, in a multi-administrative domain, cooperation among nodes can contribute to discovering which APs are available for which domain. For example, an MN 130 can decide to move to one AP and/or domain instead of another AP and/or domain based in part on, for example, roaming agreements and/or billing.

Some embodiments can propagate information about service availability. For example, an MN 130 can perform a handoff to a particular AP because of services available at the AP. Services that can be considered, can be, for example, available encryption types, authentication, a minimum guaranteed bit rate, available bandwidth, and/or availability of other types of networks, such as, for example, Bluetooth, Ultra-wideband (UWB), and/or 3G cellular networks.

Some embodiments can provide benefits related to adaptation to changes in network topology. For example, if an MN 130 determines that some entries in its cache are stale, it can update its cache and communicate such changes to other MNs 130. This can also be done for virtual changes to network topology, such as, changes in the power levels of APs. This may be of use, for example, when using IEEE 802.11h equipment, which may, for example, include APs that change power levels more frequently than other network types. In some embodiments, cooperation can be used to negotiate and/or adjust an MN 130's transmission power levels to, for example, reduce interference.

In some embodiments, passive scanning can be used to, for example, determine when a particular AP will send a beacon frame. In some embodiments, an MN 130 can collect statistics for various APs using passive scanning and without having to wait for an entire beacon interval on each channel. In some embodiments, various MNs 130 can share information about beacon intervals of APs and MNs 130 can synchronize among themselves without synchronizing on the network side. Such synchronization can be performed, for example, using Network Time Protocol (NTP).

In some embodiments, there can be interaction between nodes in an infrastructure network and nodes in an ad-hoc and/or mesh network. In some embodiments, an MN 130 in ad-hoc mode can send information about its ad-hoc network. This information can be received by MNs 130 in an infrastructure network, and can be used to decide, for example, whether an MN 130 should switch to the ad-hoc network. This may be done, for example, if there is a lack of coverage or if there is high congestion in the infrastructure network. In some embodiments, an MN 130 can switch to an ad-hoc network if needs to recover data that is available in the ad-hoc network, such as, for example, in a sensor network.

In some embodiments, two or more MNs 130 can switch, for example, from an infrastructure network to an ad-hoc network, which may have been discovered earlier, to communicate with each other without the support of the infrastructure network. In some embodiments, MNs 130 can create an ad-hoc network using, for example, a default channel, if, for example, an ad-hoc network is not available.

Figure 10:
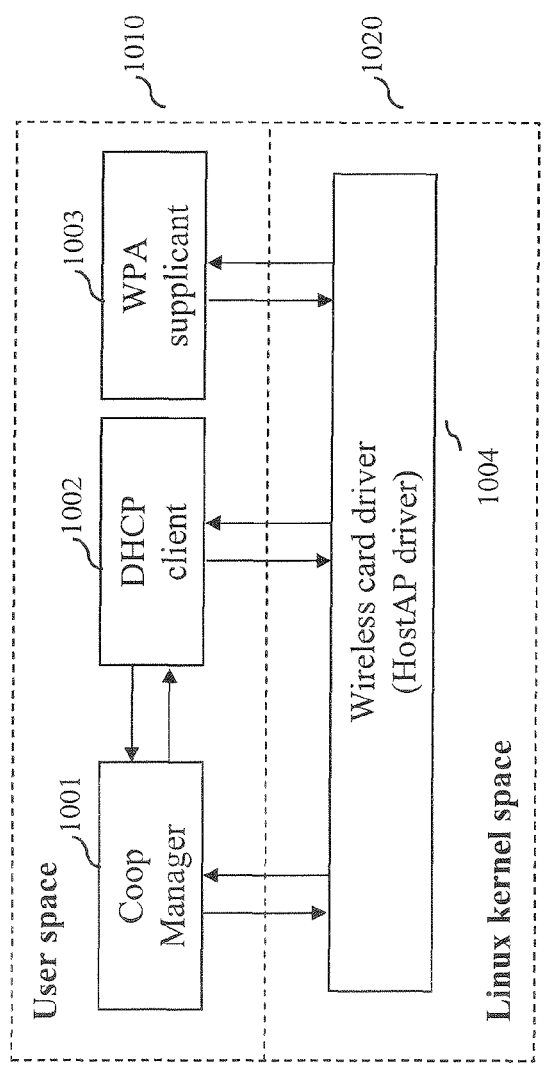
FIG. 10 is an illustration of a possible arrangement of a Coop Manager, a DHCP client, a WPA supplicant, and a wireless card driver that can be used in accordance with some embodiments of the disclosed subject matter.

In some embodiments, a wireless network card driver and a DHCP client can be modified to, for example, support cooperation. Additionally, a cooperation manager can be used, for example, to preserve state information and coordinate the wireless network card driver and a DHCP client. In some embodiments, a Wi-Fi Protected Access (WPA) protocol can be modified to enable relaying of unencrypted frames. Any appropriate wireless driver, WPA supplicant, and/or DHCP client can be used. In some embodiments, a UDP packet generator can be used to simulate voice traffic, such as, for example, small packets with certain packetization interval, such as 20 ms. FIG. 10 illustrates a possible arrangement of a Coop Manager 1001, a DHCP client 1002, and a WPA supplicant 1003, running in user space 1010, and a wireless card driver 1004, running in Linux kernel space 1020. In some embodiments, authentication measurements of, for example, embodiments using the structure of FIG. 10, can be performed using a RADIUS server. In some embodiments, packet exchanges and/or handoff events can be recorded using wireless sniffers. Some embodiments can use one wireless sniffer per channel. Information from such sniffers, can be recorded in trace files and can be analyzed to determine and/or analyze, for example, performance information.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, although APs were sometimes used as example points of access, the disclosed subject matter is not limited in this matter. Rather, according to various embodiments, various points of access can be used. Furthermore, features of the disclosed embodiments can be combined and rearranged in various ways. The present invention is limited only by the claims that follow.

What is claimed is:

1. A method for facilitating moving a connection from one point of access to another point of access, comprising:
   receiving a request for information from a first mobile node at at least one other mobile node, wherein the request for information contains at least one first entry, wherein each first entry is for a unique point of access in a first set of at least one point of access and includes first information identifying the unique point of access corresponding to the first entry;
   determining that a second set of at least one point of access are not included in the first set of points of access; and
   sending a response containing at least one second entry, wherein each second entry is for a unique point of access in the second set of at least one point of access and includes second information identifying the unique point of access corresponding to the second entry.

2. The method of claim 1, wherein at least one of the first mobile node and the at least one other mobile node is voice-over-Internet-Protocol phone.

3. The method of claim 1, wherein the information identifying the unique point of access of at least one of the first information and the second information is a Media Access Control address.

4. The method of claim 1, wherein the information identifying the unique point of access of at least one of the first information and the second information contains at least one of a channel and a subnet identifier.

5. The method of claim 1, wherein at least one of the request and the response are multicast packets.

6. The method of claim 1, wherein at least one of the first mobile node and the at least one other mobile node is in ad-hoc mode.

7. The method of claim 1, wherein the first information and the second information each contain a list and wherein the lists are of the same format.

8. The method of claim 1, further comprising storing the at least one second entry in a cache.

9. A device that can facilitate moving a connection from one point of access to another point of access, comprising:
   an interface in communication with a network;
   a memory; and
   a processor in communication with the memory and the interface; wherein the processor:
   receives a request for information from at least one mobile node, wherein the request for information contains at least one first entry, wherein each first entry is for a unique point of access in a first set of at least one point of access and includes first information identifying the unique point of access corresponding to the first entry;
   determines that a second set of at least one point of access are not included in the first set of points of access; and
   sends a response containing at least one second entry, wherein each second entry is for a unique point of access in the second set of at least one point of access and includes second information identifying the unique point of access corresponding to the second entry.

10. The device of claim 9, wherein at least one of the device and the at least one mobile node is voice-over-Internet-Protocol phone.

11. The device of claim 9, wherein the information identifying the unique point of access of at least one of the first information and the second information is a Media Access Control address.

12. The device of claim 9, wherein the information identifying the unique point of access of at least one of the first information and the second information contains at least one of a channel and a subnet identifier.

13. The device of claim 9, wherein at least one of the request and the response are multicast packets.

14. The device of claim 9, wherein at least one of the device and the at least one mobile node is in ad-hoc mode.

15. The device of claim 9, wherein the first information and the second information each contain a list and wherein the lists are of the same format.

16. The device of claim 9, wherein the processor further stores the at least one second entry in a cache.

17. A non-transitory computer-readable medium containing computer-executable instructions that, when executed by a processor, cause the processor to perform a method for facilitating moving a connection from one point of access to another point of access, the method comprising:
receiving a request for information from a first mobile node at at least one other mobile node, wherein the request for information contains at least one first entry, wherein each first entry is for a unique point of access in a first set of at least one point of access and includes first information identifying the unique point of access corresponding to the first entry;
determining that a second set of at least one point of access are not included in the first set of points of access; and
sending a response containing at least one second entry, wherein each second entry is for a unique point of access in the second set of at least one point of access and includes second information identifying the unique point of access corresponding to the second entry.

18. The non-transitory computer-readable medium of claim 17, wherein at least one of the first mobile node and the at least one other mobile node is voice-over-Internet-Protocol phone.

19. The non-transitory computer-readable medium of claim 17, wherein the information identifying the unique point of access of at least one of the first information and the second information is a Media Access Control address.

20. The non-transitory computer-readable medium of claim 17, wherein the information identifying the unique point of access of at least one of the first information and the second information contains at least one of a channel and a subnet identifier.

21. The non-transitory computer-readable medium of claim 17, wherein at least one of the request and the response are multicast packets.

22. The non-transitory computer-readable medium of claim 17, wherein at least one of the first mobile node and the at least one other mobile node is in ad-hoc mode.

23. The non-transitory computer-readable medium of claim 17, wherein the first information and the second information each contain a list and wherein the lists are of the same format.

24. The non-transitory computer-readable medium of claim 17, the method further comprising storing the at least one second entry in a cache.

25. The method of claim 1, further comprising establishing a connection between the first mobile node and a point of access identified in the second information.

26. The device of claim 9, wherein the processor also establishes a connection between the first mobile node and a point of access identified in the second information.

27. The non-transitory computer-readable medium of claim 17, wherein the method further comprises establishing a connection between the first mobile node and a point of access identified in the second information.

\* \* \* \* \*